US012711786B2

(12) United States Patent
Yoshimi

(10) Patent No.: US 12,711,786 B2
(45) Date of Patent: Aug. 18, 2026

(54) ASSOCIATING TWO DIMENSIONAL LABEL DATA WITH THREE-DIMENSIONAL POINT CLOUD DATA

(71) Applicant: NEC Corporation, Tokyo (JP)

(72) Inventor: Kosuke Yoshimi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 18/739,480

(22) Filed: Jun. 11, 2024

(65) Prior Publication Data

US 2024/0331413 A1 Oct. 3, 2024

Related U.S. Application Data

(63) Continuation of application No. 17/435,496, filed as application No. PCT/JP2019/009169 on Mar. 7, 2019, now Pat. No. 12,046,055.

(51) Int. Cl.
*G06V 20/64* (2022.01)
*G06V 10/26* (2022.01)
(Continued)

(52) U.S. Cl.
CPC ............ *G06V 20/647* (2022.01); *G06V 10/26* (2022.01); *G06V 10/762* (2022.01); *G06V 20/70* (2022.01)

(58) Field of Classification Search
CPC .... G06V 20/647; G06V 10/26; G06V 10/762; G06V 20/70; G06V 20/653; G06V 10/143; G06V 10/766; G06T 7/174
See application file for complete search history.

(56) References Cited

U.S. PATENT DOCUMENTS 9,245,170 B1 * 1/2016 Nikic ...................... G06T 17/05
9,251,399 B2 2/2016 Hwang ..................... G06T 7/11
(Continued)

FOREIGN PATENT DOCUMENTS

JP 2003-141548 A 5/2003
JP 2009-076096 A 4/2009
JP 2016-003886 A 1/2016

OTHER PUBLICATIONS

Boulch et al, Unstructured point cloud semantic labeling using deep segmentation networks, Eurographics Workshop on 3D Object Retrieval (2017) (Year: 2017).*
(Continued)

*Primary Examiner* — Andrae S Allison
(74) *Attorney, Agent, or Firm* — Sughrue Mion, PLLC

(57) ABSTRACT

An image processing device is provided that can easily generate label data used for an object recognition technology using three-dimensional point cloud data. The image processing device (1) includes a three-dimensional point cloud obtaining unit (2), a two-dimensional label obtaining unit (4), and a label conversion unit (6). The three-dimensional point cloud obtaining unit (2) obtains three-dimensional point cloud data that represents a three-dimensional point cloud of an object. The two-dimensional label obtaining unit (4) obtains two-dimensional label data corresponding to a two-dimensional image of the object. The label conversion unit (6) associates the two-dimensional label data with the three-dimensional point cloud data, and converts the two-dimensional label data into three-dimensional point cloud label data that indicates a label of the three-dimensional point cloud.

33 Claims, 16 Drawing Sheets

(51) Int. Cl.
*G06V 10/762* (2022.01)
*G06V 20/70* (2022.01)

(56) References Cited

U.S. PATENT DOCUMENTS

| | | | | |
|---|---|---|---|---|
| 11,061,406 | B2 * | 7/2021 | Mao | B60W 30/0956 |
| 11,361,457 | B2 * | 6/2022 | Shen | G01S 17/86 |
| 11,494,937 | B2 * | 11/2022 | Urtasun | G01S 17/86 |
| 11,585,923 | B2 * | 2/2023 | Taalimi | G06N 7/01 |
| 11,747,444 | B2 * | 9/2023 | Chattopadhyay | G01S 17/42 356/5.01 |
| 2003/0076991 | A1 | 4/2003 | Nishide | |
| 2010/0051658 | A1 | 3/2010 | Hwang | G06V 20/64 |
| 2013/0051658 | A1 * | 2/2013 | Hwang | G06V 20/64 382/154 |
| 2014/0192050 | A1 * | 7/2014 | Qiu | G06V 20/653 345/420 |
| 2018/0157920 | A1 | 6/2018 | Hu | |
| 2020/0125112 | A1 * | 4/2020 | Mao | G06F 18/217 |
| 2020/0160559 | A1 * | 5/2020 | Urtasun | G06V 10/82 |
| 2020/0175720 | A1 * | 6/2020 | Hsu | H04N 13/293 |
| 2021/0199799 | A1 * | 7/2021 | Taalimi | G06N 7/01 |
| 2021/0287058 | A1 * | 9/2021 | Yoshimi | G06V 30/242 |
| 2021/0326608 | A1 * | 10/2021 | Yoshimi | G06V 20/58 |
| 2022/0027654 | A1 * | 1/2022 | Iwami | G06V 20/647 |
| 2022/0092291 | A1 * | 3/2022 | Lai | G01S 17/42 |
| 2022/0405894 | A1 * | 12/2022 | Yoshimi | G06V 10/7792 |

OTHER PUBLICATIONS

Ientilucci, E. J., Kelbe, D. J., Salvaggio, C., & Yousefhussien, M. (2017). A Fully Convolutional Network for Semantic Labeling of 3D Point Clouds. arXiv preprint arXiv:1710.01408 (Year: 2017).*

D. I. Kim and G. S. Sukhatme, "Semantic labeling of 3D point clouds with object affordance for robot manipulation," 2014 IEEE International Conference on Robotics and Automation (ICRA), Hong Kong, China, 2014, pp. 5578-5584, doi: 10.1109/ICRA.2014.6907679. (Year: 2014).*

International Search Report for PCT Application No. PCT/JP2019/009169, mailed on May 7, 2019.

N. Silberman et al., "Indoor Segmentation and Support Inference from RGBD Images", 12th European Conference on Computer Vision, Florence, Italy, Oct. 7-13, 2012, pp. 1-14.

S. Song et al., "SUN RGB-D: A RGB-D Scene Understanding Benchmark Suite", Proceedings of 28th IEEE Conference on Computer Vision and Pattern Recognition (CVPR2015), Boston, MA, USA, Jun. 7-12, 2015.

Midori Kurahashi et al., "An approach to detection of car position using LiDAR data for automatic parking", Proceedings of the 79th National Convention of IPSJ (Information Processing Society of Japan) (2) Artificial Intelligence and Cognitive Science, Mar. 16, 2017.

Z. Zhongyang, C. Yinglei, S. Xiaosong, Q. Xianxiang and S. Li, "Classification of LiDAR Point Cloud based on Multiscale Features and PointNet," 2018 Eighth International Conference on Image Processing Theory, Tools and Applications (IPTA). Xi'an, China, 2018, pp. 1-7, (Year: 2018).

W. Dongyu, H. Fuwen, T. Mikolajczyk and H. Yunhua, "Object Detection for Soft Robotic Manipulation Based on RGB-D Sensors," 2018 WRC Symposium on Advanced Robotics and Automation (WRC SARA), Beijing, China, 2018, pp. 52-58, doi: 10.1109/WRC-SARA.2018.8584237. (Year: 2018).

Engelmann, Francis, et al. "Exploring spatial context for 3D semantic segmentation of point clouds." Proceedings of the IEEE international conference on computer vision workshops. 2017. (Year: 2017).

L. Tchapmi, C. Choy, I. Armeni. J. Gwak and S. Savarese, "SEGCloud: Semantic Segmentation of 3D Point Clouds," 2017 International Conference on 3D Vision (3DV), Qingdao. China. 2017. pp. 537-547, doi: 10.1109/3DV.2017.00067. (Year: 2017).

J. Wang, Q. Xie, Y. Xu, L. Zhou, and N. Ye, "Cluttered indoor scene modeling via functional part-guided graph matching," Comput. Aided Geometric Des., vol. 43, pp. 82-94, 2016 (Year: 2016).

Hu et al, Semantic Labeling and Instance Segmentationof 3D Point Clouds Using Patch Context Analysis and Multiscale Processing) IEEE Transactions on Visualization and Computer Graphics, vol. 26, No. 7, Jul. 2020 2485 (Year: 2020).

Zhang, Jie, et al. "Point cloud normal estimation via low-rank subspace clustering." Computers & Graphics 37.6 (2013): 697-706. (Year: 2013).

* cited by examiner $$X_{cam} = T_{vc}\, X_{vel}$$
$$X_{vel}, X_{cam} \in \mathbb{R}^4$$
$$X_{img} \in \mathbb{R}^3$$
$$T_{vc} \in \mathbb{R}^{4\times 4}$$

*(nonlinear camera model)*

$$P_{ci} : \mathbb{R}^4 \mapsto \mathbb{R}^3$$
$$X_{img} = P_{ci}\,(X_{cam}) = P_{ci}\,(T_{vc} \cdot X_{vel})$$

*(linear camera model)*

$$P_{ci} \in \mathbb{R}^{3\times 4}$$
$$X_{img} = P_{ci}\, X_{cam} = P_{ci} \cdot T_{vc} \cdot X_{vel}$$

$$IBR(i,j) = \frac{Num\,(p \in C_i \cap B_j)}{Num(p \in C_i)}$$

$$IoU(i,j) = \frac{Area\ (D_i \cap B_j)}{Area(D_i \cup B_j)}$$

ASSOCIATING TWO DIMENSIONAL LABEL DATA WITH THREE-DIMENSIONAL POINT CLOUD DATA

This application is a continuation application of U.S. patent application Ser. No. 17/435,496 filed on Sep. 1, 2021, which is a National Stage Entry of PCT/JP2019/009169 filed on Mar. 7, 2019, the contents of all of which are incorporated herein by reference, in their entirety.

TECHNICAL FIELD

The present invention relates to an image processing device, an image processing method, and a recording medium.

BACKGROUND ART

Currently, statistical machine learning methods are used for recognition technologies using images and the like. Such statistical machine learning indispensably prepare a large amount of label data assigned correct labels related to recognition targets, and use the label data for learning and evaluation. Technologies related to labeling are described in Non Patent Literatures 1 and 2.

As for the technologies, Patent Literature 1 discloses a shape extracting device capable of extracting the shape of an object from three-dimensional point cloud data at high speed even if the amount of three-dimensional point cloud data is enormous. The technology pertaining to Patent Literature 1 sets an inclusive voxel that covers all the points in the three-dimensional point cloud data. The technology pertaining to Patent Literature 1 divides the inclusive voxel into a plurality of virtual voxels having a larger size than the pitch of the points. The technology pertaining to Patent Literature 1 assigns unique identification numbers to the respective virtual voxels. Furthermore, the technology pertaining to Patent Literature 1 performs a labeling process in units of virtual voxels according to whether any point is present in the corresponding virtual voxel assigned the identification number, and assigns the same label value to linked virtual voxels among the virtual voxels containing the points.

CITATION LIST

Patent Literature

Patent Literature 1: Japanese Unexamined Patent Application Publication No. 2016-003886

Non Patent Literature

Non Patent Literature 1: N. Silberman, D. Hoiem, P. Kohli, and R. Fergus. "Indoor segmentation and support inference from RGBD images", In European Conference on Computer Vision (ECCV), 2012. https://cs.nyu.edu/~silberman/datasets/nyu_depth_v2.html Non Patent Literature 2: S. Song, S. Lichtenberg, and J. Xiao. "SUN RGB-D: A RGB-D Scene Understanding Benchmark Suite", In Proceedings of 28th IEEE Conference on Computer Vision and Pattern Recognition (CVPR2015) http://rgbd.cs.princeton.edu/

SUMMARY OF INVENTION

Technical Problem

According to the method of assigning the same label value to the linked virtual voxels as in Patent Literature 1 described above, it is unknown which object the virtual voxels correspond to. Accordingly, in order to perform an object recognition process using the method pertaining to Patent Literature 1, it may be required to manually identify which object the label value assigned to the virtual voxel corresponds to. Consequently, according to the method pertaining to Patent Literature 1, it is difficult to easily generate label data used for the object recognition technology using three-dimensional point cloud data.

The present disclosure has been made in order to solve such a problem, and has an object to provide an image processing device, an image processing method and a recording medium that can easily generate label data used for an object recognition technology using three-dimensional point cloud data.

Solution to Problem

An image processing device according to the present disclosure includes: three-dimensional point cloud obtaining means for obtaining three-dimensional point cloud data that represents a three-dimensional point cloud of an object; two-dimensional label obtaining means for obtaining two-dimensional label data that is label data corresponding to a two-dimensional image of the object; and label conversion means for associating the two-dimensional label data with the three-dimensional point cloud data, and converting the two-dimensional label data into three-dimensional point cloud label data that indicates a label of the three-dimensional point cloud.

An image processing method according to the present disclosure includes: obtaining three-dimensional point cloud data that represents a three-dimensional point cloud of an object; obtaining two-dimensional label data that is label data corresponding to a two-dimensional image of the object; and associating the two-dimensional label data with the three-dimensional point cloud data, and converting the two-dimensional label data into three-dimensional point cloud label data that indicates a label of the three-dimensional point cloud.

A program according to the present disclosure causes a computer to execute: a step of obtaining three-dimensional point cloud data that represents a three-dimensional point cloud of an object; a step of obtaining two-dimensional label data that is label data corresponding to a two-dimensional image of the object; and a step of associating the two-dimensional label data with the three-dimensional point cloud data, and converting the two-dimensional label data into three-dimensional point cloud label data that indicates a label of the three-dimensional point cloud.

Advantageous Effects of Invention

According to the present disclosure, an image processing device, an image processing method and a recording medium that can easily generate label data used for an object recognition technology using three-dimensional point cloud data can be provided.

DESCRIPTION OF EMBODIMENTS (Overview of Example Embodiments According to Present Disclosure)

Figure 1:
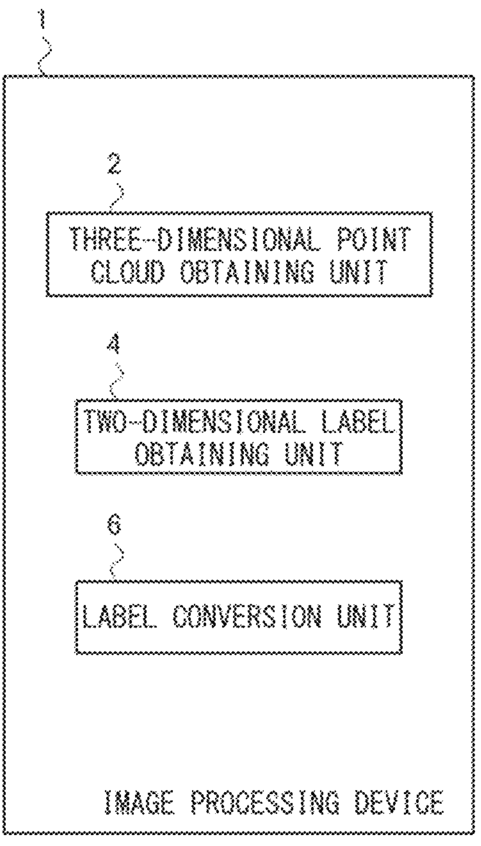
FIG. 1 is a diagram showing an overview of an image processing device according to example embodiments of the present disclosure.

Prior to description of example embodiments of the present disclosure, an overview of the example embodiments according to the present disclosure is described. FIG. 1 is a diagram showing the overview of an image processing device 1 according to the example embodiments of the present disclosure. The image processing device 1 is a computer, for example. The image processing device 1 includes a three-dimensional point cloud obtaining unit 2, a two-dimensional label obtaining unit 4, and a label conversion unit 6. The three-dimensional point cloud obtaining unit 2 functions as three-dimensional point cloud obtaining means. The two-dimensional label obtaining unit 4 functions as two-dimensional label obtaining means. The label conversion unit 6 functions as label conversion means.

The three-dimensional point cloud obtaining unit 2 obtains three-dimensional point cloud data that represents a three-dimensional point cloud of an object. The two-dimensional label obtaining unit 4 obtains two-dimensional label data corresponding to a two-dimensional image of the object. The label conversion unit 6 associates the two-dimensional label data with the three-dimensional point cloud data, and converts the two-dimensional label data into three-dimensional point cloud label data that indicates a label of the three-dimensional point cloud.

<Problem of High Cost of Data for General Machine Learning>

Hereinafter, a problem of a related art is described. Currently, a statistical machine learning method is used for recognition technologies using images and the like. In order to achieve this, it is indispensable to prepare a large amount of data assigned correct labels related to a recognition target domain, and to use the data for learning and evaluation. Currently, to prepare such labelled data, a significantly high cost is required in view of time, money, and efforts.

<Image Label Generation Method>

In a case of intending to detect recognition target classes on an image (e.g., a person, a car, furniture, etc.), typically, the label data is saved text data that associates the positions of recognition target objects (target objects) on the image with target class names. Here, for example, the position of each target object can be represented by a vector that represents a rectangle encircling the target object. For example, this vector is represented such as [upper left x coordinate, upper left y coordinate, rectangle width, rectangle height] in pixels of the image. The target class name is represented as "Car", "Pedestrian", for example.

To perform a label assigning operation, a tool that includes a GUI (Graphical User Interface) operated by a user is used. The GUI presents a visual image on a screen. The user operates a mouse cursor and the like to select the upper left coordinates and the lower right coordinates of a rectangle that encircles each target object on the visual image, thus designating a rectangular region. The user inputs label information, such as a class name, through text input, a preliminarily designated selection button or the like.

In a case where the intended output result is not by position detection through a rectangle but is image segmentation for the sake of distinctly painting regions on a pixel level, the regions of objects designated by the label assigning operation are distinctly painted in units of pixels instead of rectangles. Here, designation of rectangles is relatively simple. However, the cost of designating image segmentation regions is relatively high.

<3D LiDAR and Point Cloud Data>

In recent years, technologies of measuring three-dimensional structures widely used for geomorphic investigation, automated driving, etc. (or a measurement device using the technologies) include, for example, 3D LiDAR (Light Detection And Ranging, Laser Imaging Detection and Ranging). The 3D LiDAR means technologies capable of accumulating, as three-dimensional point cloud data, distance data from a measurement point on shielding objects in a three-dimensional space highly densely and widely with respect to a conventional single-line scanner and the like, and measurement devices thereof. The three-dimensional point cloud data is data in which the structure of an actual environment obtained by the 3D LiDAR is reflected, for example. The three-dimensional point cloud data is data indicating a three-dimensional point cloud that is a set of points (three-dimensional points) having three-dimensional coordinate information obtained through reflection from target objects, such as people and automobiles, and structural objects, such as the ground, buildings, and signage.

<Label Assigning to Three-Dimensional Point Cloud Data>

To visualize a calculation result of three-dimensional point cloud data obtained through 3D LiDAR or the like, typically, the three-dimensional coordinates of individual points are depicted through a three-dimensional viewer or the like. The points obtained this time are scattered in a three-dimensional space. It is significantly difficult to manually label such a large amount of three-dimensionally distributed points while viewing through the three-dimensional viewer or the like, and there is a possibility that a high cost is caused.

Here, one example of technologies pertaining to labelling is a method of assigning pixel labels to data, as described in Non Patent Literature 1. This method assigns common label data to a visual camera image and a depth image. The method obtains a combination of a visual camera image and a depth image that stores distance data associated with the visual camera image in units of pixels, using an RGB-D camera, such as KINECT®. The target object region in the visual camera image is distinctly painted on a pixel level with respect to each classification, thereby assigning common label data to the visual camera image and the depth image. The RGB-D camera can reconstruct the three-dimensional point cloud that is an aggregation of three-dimensional coordinate data items on the object captured by the sensor, from the geometrical relational expression between the optical system and pixels on the image, and the depth image. Accordingly, it is conceivable that use of this method can generate three-dimensional point cloud labels from image labels in units of pixels. However, this method is required to manually perform a distinct painting operation of the labels in units of pixels on the basis of the object region on the image, and has a problem in that the operation cost is significantly high.

Another example of technologies pertaining to labelling is a method of assigning a three-dimensional box label to data, as described in Non Patent Literature 2. This method proposes an GUI capable of assigning label information, as an "annotation tool". This method uses the output of the RGB-D camera to present a visual image, and a pseudo viewpoint image of a color point cloud from multiple viewpoints (front, top-down, side, etc.) obtained by assigning color information obtained from the visual image to a three-dimensional point cloud. The user then uses the annotation tool to designate a three-dimensional box region encircling a label-assigned target object while operating the mouse cursor on four types of viewpoint images and assigns the label information corresponding to the region. This method has an advantage of capability of correctly designating the three-dimensional region encircling the target object, but has a problem in that the designation of the position on the multi-viewpoint images is required to be finely adjusted through the mouse cursor, and the input requires efforts.

With respect to such a problem, the image processing device 1 according to the present disclosure is configured as described above. Accordingly, this device can reduce the cost of labeling the three-dimensional point cloud, and more simply generate the three-dimensional point cloud label. Specifically, since the image processing device 1 according to the present disclosure is configured as described above, this device can label the corresponding three-dimensional point cloud only on the basis of the two-dimensional object label defined on the visual image. Accordingly, label assigning to the three-dimensional point cloud can be achieved by executing simpler label assigning to the two-dimensional plane, thereby allowing the cost through the manual operation to be reduced. Furthermore, the two-dimensional label to the two-dimensional camera image is used as an input. Accordingly, a database having common label data between the camera image and the corresponding three-dimensional point cloud can be generated.

As described above, according to the present disclosure, in an imaging system where an RGB-D camera or a 3D LiDAR and a visual camera are combined, the two-dimensional rectangular label defined on the visual image plane is assigned, which can automatically achieve label assigning to the three-dimensional point cloud. Accordingly, learning data required to develop recognition technologies, such as object identification and detection using three-dimensional point cloud data, can be easily generated. Note that the present example embodiment assumes that there is calibration data allowing mapping from the three-dimensional point cloud onto the visual image.

The two-dimensional label that is defined on the visual image and is used as an input may thus be provided through manual operation; not limited thereto, the process may be semi-automated through use of an output of a detector for an object having already been preliminarily learned with existing learning data, by a method of manually correcting only errors. Specifically, accompanied by significant development of image recognition technologies in recent years, abundant labelled datasets have already been prepared in readily available states for object detection on a two-dimensional image. Even a detector through existing deep learning or the like can be expected to achieve a performance to a certain extent, except for special objects, and can automatically generate the two-dimensional label accordingly.

Furthermore, as described above, the present disclosure has an advantage by commonizing the label data to the camera image and the three-dimensional point cloud in a state of allowing association with each other. In a specific example, labelled three-dimensional point clouds are projected onto a two-dimensional image plane, and a process of filling up the gaps between point clouds on the plane that are assigned the same label or the like is applied, which can generate segmentation label data on image data. As described above, the label data is shared by the two-dimensional image and the three-dimensional point cloud, thereby allowing mutual conversion and interpolation of label data.

First Example Embodiment

An example embodiment is described with reference to the drawings. In order to clarify the illustration, items of the following description and drawings are appropriately omitted and simplified. In each drawing, the same elements are assigned the same symbols, and redundant description is omitted as required.

The description of the example embodiments hereafter mainly assumes a recognition task that detects and identifies objects, such as automobiles and pedestrians, in an actual environment from observation data, that is, machine learning for the sake of object detection, and label data generation for evaluation thereof. However, the application range of the present disclosure is not specifically limited thereto. The method of obtaining the three-dimensional point cloud is not limited to LiDAR. The three-dimensional point cloud may be obtained using another three-dimensional range sensor (RGB-D camera).

Figure 2:
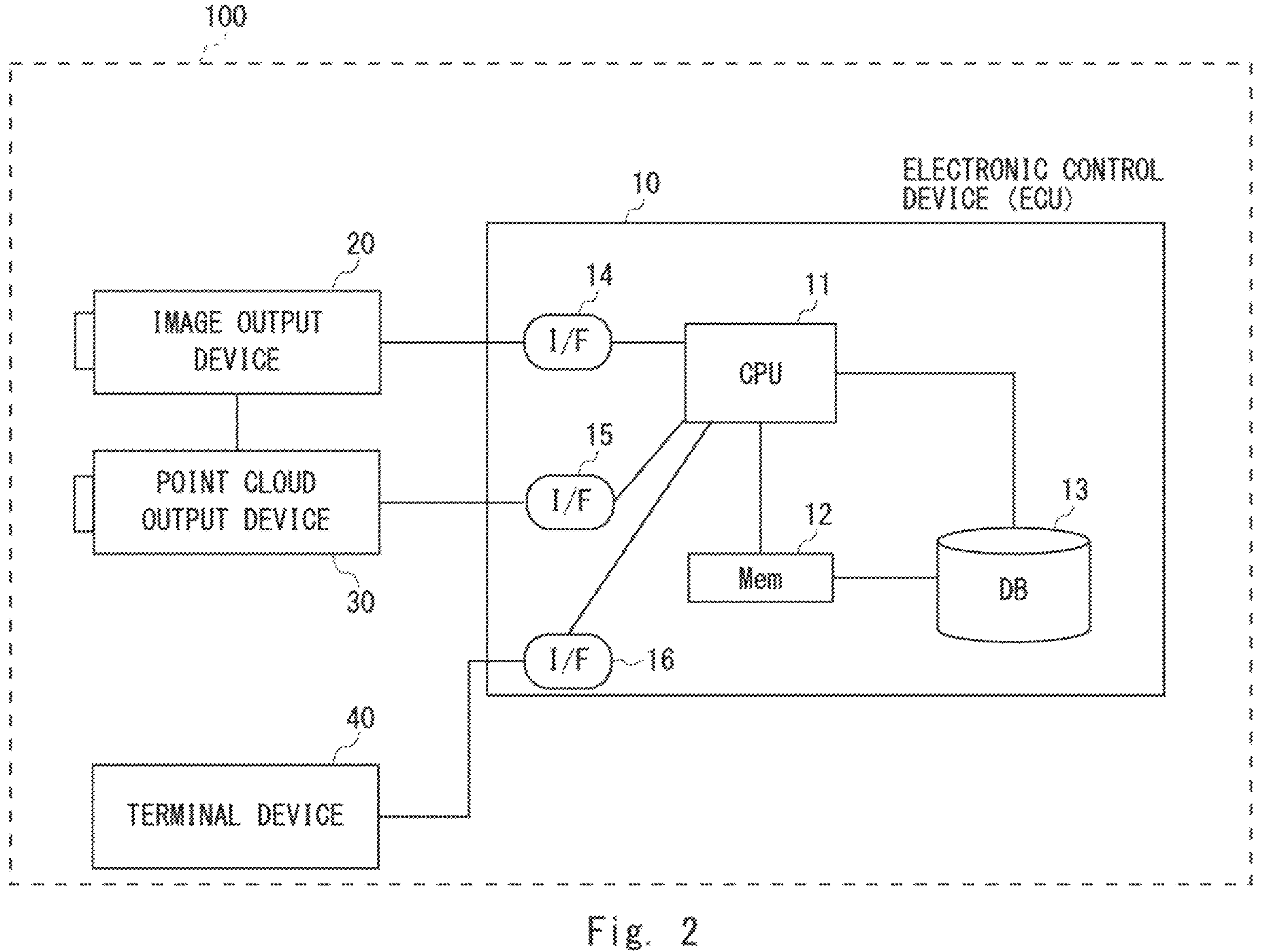
FIG. 2 is a block diagram showing a configuration of an image processing system according to a first example embodiment.

FIG. 2 is a block diagram showing a configuration of an image processing system 100 according to the first example embodiment. The image processing system 100 includes an electronic control device 10, an image output device 20, a point cloud output device 30, and a terminal device 40. The image output device 20 is a device that at least outputs image information to the electronic control device 10. The image output device 20 is, for example, a camera device. The camera device is an imaging device that takes images in real time, and consecutively obtains images of an imaging target. The imaging device may be, for example, a video camera or the like that outputs various types of digital images, such as of the NTSC (National Television Standards Committee) format or PAL (Phase Alternating Line) format.

The image output device 20 may be not only the camera device, but also an image capture device that reads image information stored in a storage medium, converts the information into information having an image format, such as the NTSC format or PAL format, readable by the electronic control device 10, and outputs the information. The image output device 20 in this case can be achieved as a software program operable in a CPU of the electronic control device 10.

The point cloud output device 30 is a device that at least outputs three-dimensional point cloud data to the electronic control device 10. The three-dimensional point cloud data is data that at least includes a set (three-dimensional point cloud) of points having coordinate information (x, y, z) in a three-dimensional space. Typically, the three-dimensional point cloud data is obtained as data through sampling positions on the surface of objects (objects and structural objects) in the three-dimensional space. The point cloud output device 30 is, for example, a 3D LiDAR. The 3D LiDAR is a measurement device that emits laser beams in a plurality of directions at certain horizontal angles and perpendicular angles, measures the distances of objects residing in the corresponding emitting directions on the basis of the reflection time period of the emitted light beams, obtains the three-dimensional structure therearound from the measurement result, as three-dimensional point cloud data.

Note that the point cloud output device 30 may be a reproduction device that outputs, from a storage medium, three-dimensional point cloud data obtained by any type of means. The point cloud output device 30 in this case can be achieved as a software program operable in the CPU of the electronic control device 10.

Note that the example embodiments described below assume that observation targets in a visual image (image information) obtained by the image output device 20 correspond to observation targets in a three-dimensional point cloud obtained by the point cloud output device 30. That is, data output by the image output device 20, and data output by the point cloud output device 30 are assumed to be obtained in a condition where positional relationships therebetween at the same time in the same environment have already been known, if not otherwise specified. The visual image and the three-dimensional point cloud can be at least partially associated with each other. That is, the visual field region of image information, and the three-dimensional point cloud at least partially involve each other in the corresponding actual three-dimensional space.

The electronic control device 10 is a computer that performs information processing (image processing) according to the present disclosure. The electronic control device 10 corresponds to the image processing device 1 shown in FIG. 1. The electronic control device 10 executes processes based on a predetermined program according to information output from the image output device 20 and the point cloud output device 30. The details are described later.

The terminal device 40 operates as an user interface that allows an operation of the electronic control device 10, and is for monitoring the internal state and output of the electronic control device 10. The terminal device 40 is, for example, an output device or an input device. The output device is, for example, a display. For example, the display presents an input image from the image output device 20, presents a converted image obtained by converting the input image, presents various image processing results using the converted image, or presents an image obtained by overlaying label data on the input image. The input device inputs instructions to the electronic control device 10 that include start/stop of the device, parameter designation, and selection of information to be presented on the display. The input device is, for example, a switchboard, a keyboard, a mouse, a touch panel, etc. Note that the image processing system 100 can be achieved also by a configuration that does not include the terminal device 40.

A device that uses, as an input, information obtained by the image processing system 100 can be connected to the electronic control device 10. The function of a device connected to the electronic control device 10 can be achieved as a software program operable by the CPU in the electronic control device 10. It is conceivable that examples of devices to be connected include an image processing device or a machine learning device that receives, as an input, the three-dimensional point cloud label generated according to the present example embodiment.

The electronic control device 10 includes a central processing device 11 (CPU), a storage device 12 (Mem), a storage device 13 (DB), and interfaces 14, 15 and 16. Note that in FIG. 2, the storage device 12 (Mem) and the storage device 13 (DB) are separated components. Alternatively, these components can be achieved as a single storage device.

The interface 14 is a device that mediates information exchange between the central processing device 11, the storage device 12 and the storage device 13, and the image output device 20. Note that in FIG. 2, the interface 14 is directly connected only to the image output device 20 and the central processing device 11, but may be directly connected also to the storage device 12 (Mem) and the storage device 13 (DB). This also applies to the other interfaces 15 and 16.

The interface 15 is a device that mediates information exchange between the central processing device 11, the storage device 12 and the storage device 13, and the point cloud output device 30. The interface 16 is a device that mediates information exchange between the central processing device 11, the storage device 12 and the storage device 13, and the terminal device 40. The interface 16 performs mediation in a case of outputting a result of information processing performed in the electronic control device 10 to the terminal device 40. Furthermore, the interface 16 performs mediation in a case of receiving an instruction input that is to be output from the terminal device 40 to the electronic control device 10.

The storage device 12 is a device that stores temporary data, and is electrically connected to the central processing device 11. The storage device 13 is a device that mainly stores a database (DB), and is electrically connected to the central processing device 11. Note that in FIG. 2, the storage device 12 and the storage device 13 are internally included in the electronic control device 10. Alternatively, the devices may be storage devices external to the electronic control device 10.

The central processing device 11 is a device that performs information processing, and is electrically connected to the interfaces 14, 15 and 16, the storage device 12, and the storage device 13. The central processing device 11 executes a program stored in the storage device 13. Accordingly, the central processing device 11 performs information processing according to predetermined procedures while appropriately referring to the information stored in the storage device 12 and the storage device 13, on the basis of image information input through the interface 14 and of various pieces of information input through the interfaces 15 and 16.

Figure 3:
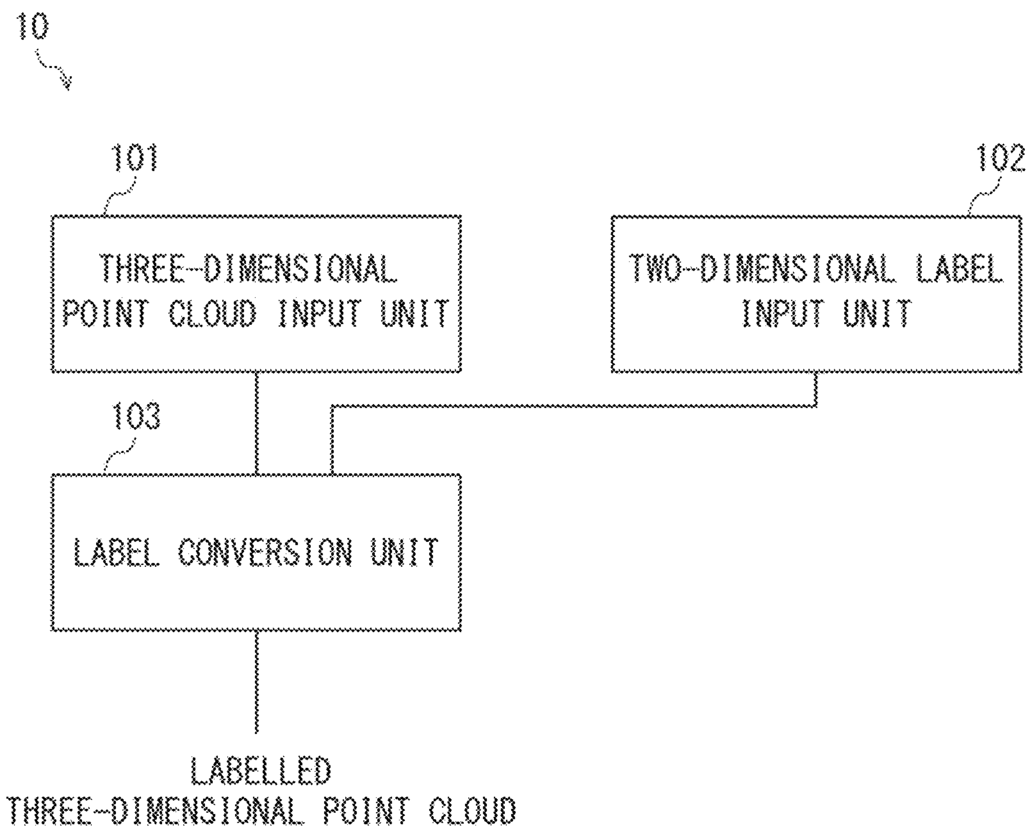
FIG. 3 is a functional block diagram schematically showing a configuration of an electronic control device according to the first example embodiment.

FIG. 3 is a functional block diagram schematically showing the configuration of the electronic control device 10 according to the first example embodiment. The electronic control device 10 achieves each of the configuration elements shown in FIG. 3 by causing the central processing device 11 to execute the software programs. Each of the configuration elements achieved in the electronic control device 10 may be achieved as an individual device, a functional unit, or an electronic circuit.

Figure 4:
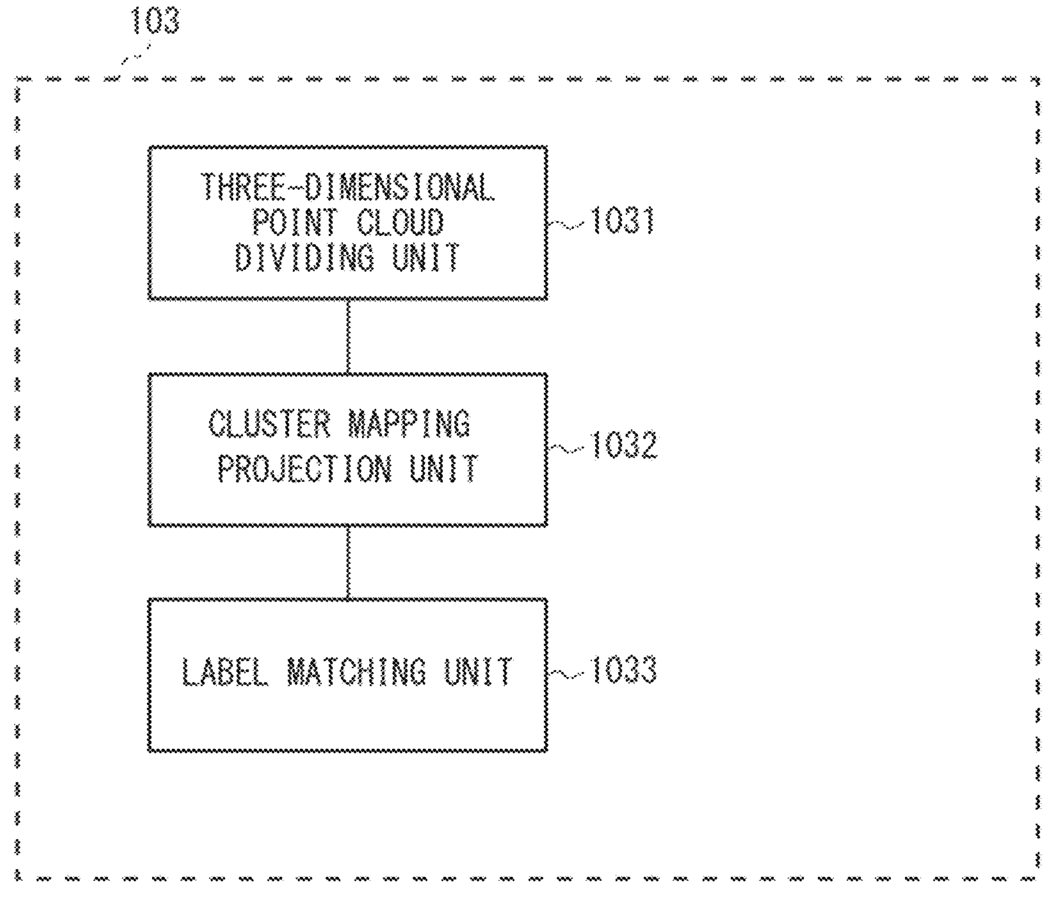
FIG. 4 is a functional block diagram schematically showing a configuration of a label conversion unit according to the first example embodiment.

As shown in FIG. 3, the electronic control device 10 according to the first example embodiment includes a three-dimensional point cloud input unit 101, a two-dimensional label input unit 102, and a label conversion unit 103. FIG. 4 is a functional block diagram schematically showing the configuration of the label conversion unit 103 according to the first example embodiment. The operations of these functions are described below.

The three-dimensional point cloud input unit 101 has a function of obtaining three-dimensional point cloud data output from the point cloud output device 30 to the electronic control device 10. The obtained three-dimensional point cloud data is data in which the structure of an actual environment obtained by the 3D LiDAR is reflected, for example. For example, the three-dimensional point cloud data is a set of points (three-dimensional points) having three-dimensional coordinate information obtained through reflection from objects, such as people or automobiles, or structural objects, such as the ground, buildings, or signage.

The two-dimensional label input unit 102 has a function of assigning label information to image data output from the image output device 20 to the electronic control device 10. The label data assigned here is what is assigned to a region defined with the two-dimensional coordinates of an image. Accordingly, the label data is hereinafter called a two-dimensional label. The two-dimensional label is made of information that includes at least the position of a recognition target object on an image plane, and a class label assigned to the object (or a unique ID label to an individual object), with respect to an image of a certain frame. Here, the "class label" is a label that indicates the type of an object, such as "Car", "Van", "Truck", or "Pedestrian". The "(unique) ID label" is, for example, a label for individual identification, such as 1, 2, 3, . . . , assigned to respective objects in the entire frame. Note that the two-dimensional label may include both the class label and the ID label.

Figure 5:
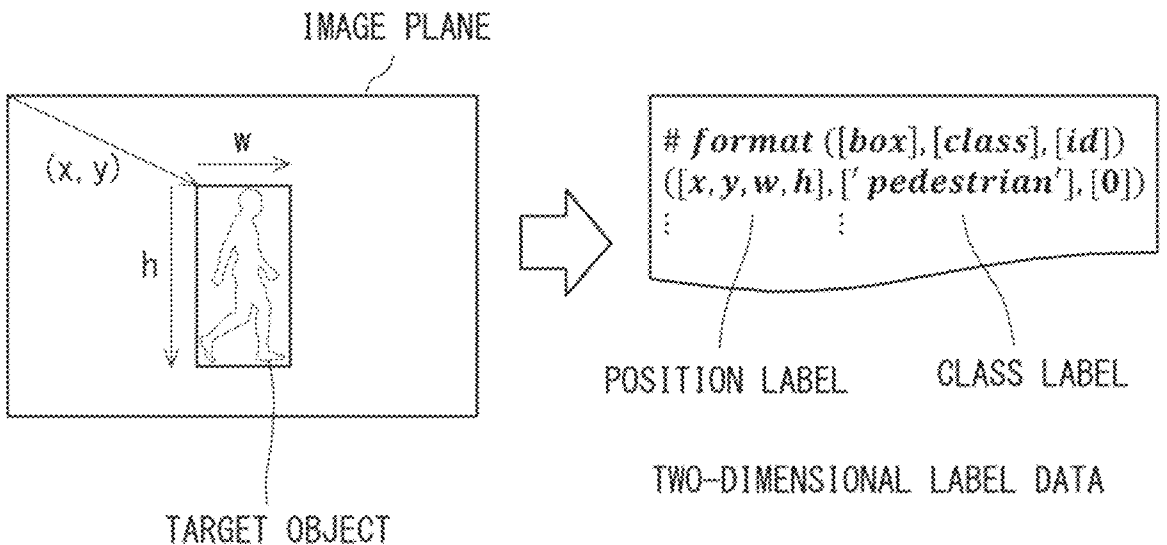
FIG. 5 is a diagram for illustrating a format of two-dimensional label data according to the first example embodiment.

FIG. 5 is a diagram for illustrating the format of two-dimensional label data according to the first example embodiment. The two-dimensional label data includes a position label indicating the position of an object, and a class label (and an ID label). The position label includes, for example, the upper left coordinates (x, y) of a rectangle encircling the object and the width (w) and height (h) of the rectangle in a two-dimensional image. The class label (ID label) indicates the class of the object corresponding to the position. The two-dimensional label data associates the position label and the class label (and ID label) with each other, and is stored in a format, such as of text data, where a list for items as many as the target objects is written with respect to each frame image.

Typically, the two-dimensional label is manually generated for the stored image data, using an image labeling tool. Note that the two-dimensional label generation method can be achieved by automatically generating the two-dimensional label using the detection result of an existing image detection technology. Alternatively, the method can be achieved by a method of manually correcting an error of a label generated by the image detection technology. As described above, according to the present example embodiment, the two-dimensional label obtaining method is not specifically limited. The main point of the present example embodiment is to generate the label associated with the three-dimensional point cloud, from the given two-dimensional label.

Figure 6:
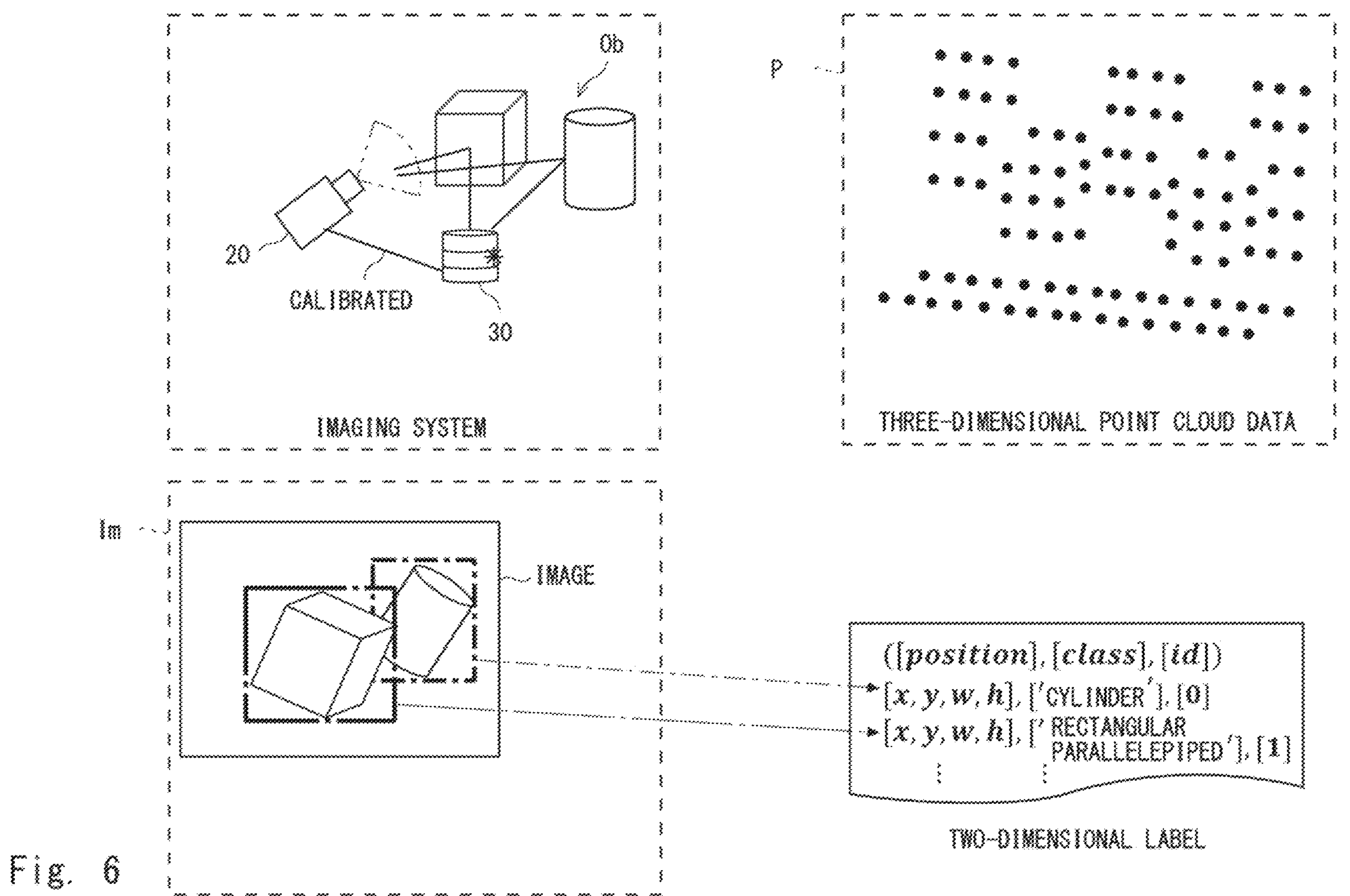
FIG. 6 is a diagram for illustrating a method of obtaining three-dimensional point cloud data and two-dimensional label data according to the first example embodiment.

FIG. 6 is a diagram for illustrating a method of obtaining three-dimensional point cloud data and two-dimensional label data according to the first example embodiment. FIG. 6 shows a schematic diagram of an imaging system for allowing the three-dimensional point cloud input unit 101 and the two-dimensional label input unit 102 to obtain data. As shown as an example in FIG. 6, data on a camera image Im (two-dimensional image) and a set P of three-dimensional point clouds is obtained from the imaging system where the positional relationship between the camera (image output device 20) and the 3D LiDAR (point cloud output device 30) have already been calibrated and fixed each other. The camera image is assigned label data, thereby preparing a two-dimensional label. For example, in the example shown in FIG. 6, through use of the camera image, an object Ob ("cylinder" and "rectangular parallelepiped") is assigned a two-dimensional label that includes a position label and a class label.

The label conversion unit 103 has a function of assigning label information corresponding to the three-dimensional point cloud, using the two-dimensional label and the three-dimensional point cloud provided by the three-dimensional point cloud input unit 101 and the two-dimensional label input unit 102. The label conversion unit 103 according to the first example embodiment is characterized by converting the two-dimensional label into the three-dimensional point cloud label on the basis of the following basic method.

Here, referring to FIG. 4, the label conversion unit 103 includes a three-dimensional point cloud dividing unit 1031, a cluster mapping projection unit 1032, and a label matching unit 1033. The three-dimensional point cloud dividing unit 1031 applies clustering to the three-dimensional point cloud in conformity with a certain rule, thereby achieving divided small clusters that are subsets of the point cloud. The cluster mapping projection unit 1032 projects the small clusters onto the same coordinate plane as that of the two-dimensional label. The label matching unit 1033 matches (associates) the small cluster with the two-dimensional label.

Here, a problem of associating the two-dimensional label with the point cloud in the three-dimensional space is that the number of dimensions on the labeling side is smaller than the number of dimensions on the side to be associated, that is, there is dimension degeneracy, and in general, association is not uniquely determined accordingly. The method according to the present example embodiment can solve such a problem by separating the three-dimensional point cloud on the side to be associated into small clusters on the basis of the three-dimensional information on the point cloud itself. That is, based on expectation that the point cloud constituting the generated small clusters is derived from a single object, the problem is simplified as a matching problem in units of small clusters instead of units of points, thereby allowing unique association to be achieved with the two-dimensional label.

Hereinafter, the detailed function of the label conversion unit 103 is described.

Figure 7:
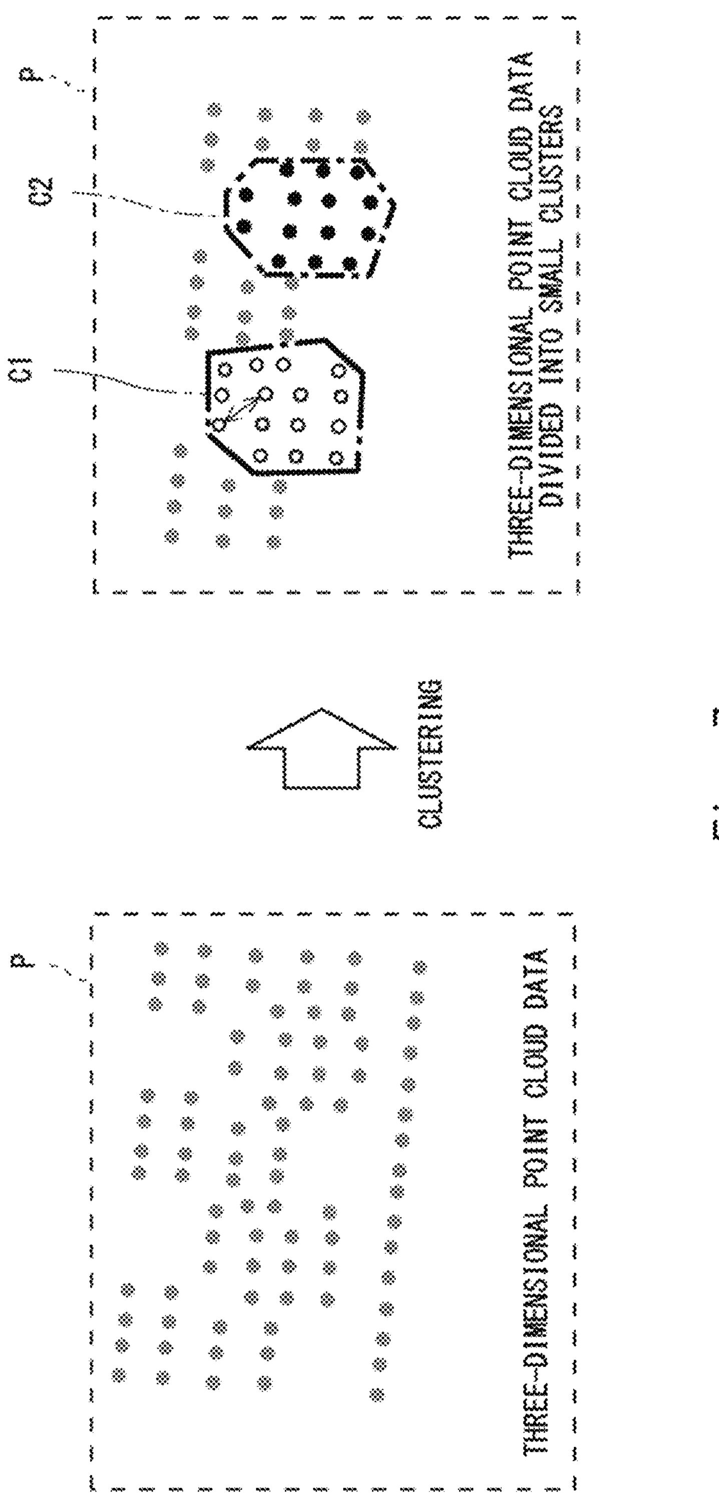
FIG. 7 is a diagram for illustrating clustering by a three-dimensional point cloud dividing unit according to the first example embodiment.

FIG. 7 is a diagram for illustrating clustering by the three-dimensional point cloud dividing unit 1031 according to the first example embodiment. As shown in FIG. 7 as an example, the three-dimensional point cloud dividing unit 1031 applies clustering to the three-dimensional point cloud received from the three-dimensional point cloud input unit 101 according to a predetermined reference, thereby dividing the point cloud into small clusters. The small cluster is a subset $C_i$ obtained by dividing the set P of three-dimensional points $p_k$ as in the following Equation 1.

[Expression 1]

$$P=\{p_k \mid k=1, \ldots, N\} \rightarrow \{C_i \mid i=1, \ldots, M\} \quad (1)$$

where N is the number of three-dimensional point clouds, and M is the number of clusters. N and M are defined depending on the dividing (clustering) method and data. In the example in FIG. 7, the three-dimensional point cloud is divided into small clusters $C_1$ (white dots) and $C_2$ (black dots).

Specifically, the three-dimensional point cloud dividing unit 1031 can process the point cloud in units of small clusters by assigning cluster IDs different among the small clusters to the points that are elements of small clusters. That is, the clustering described here has the same meaning as assigning of corresponding cluster labels to the individual three-dimensional points $p_k$. In other words, after the clustering is executed, for the points classified as the elements of a small cluster $C_i$, the same cluster ID (i) can be referred to. That is, the following Equation 2 holds.

[Expression 2]

$$ClusterID(\forall\, p \in C_i) = i \quad (2)$$

The method of dividing into small clusters is described. An existing clustering method can be used for division into small clusters. For example, as shown in the following Equation 3, distance-based clustering can be used that regards the points having an Euclidean distance between two points in a three-dimensional space smaller than a threshold, as those in the same small cluster.

[Expression 3]

$$C_i=\{p_k \mid \forall\, k \in \{l, m\}, norm(p_l, p_m) < thres_{dist}\} \quad (3)$$

where C* and p* respectively indicate the small cluster, and the point that is an element thereof. Furthermore, norm( ) indicates the distance between two points, and $thres_{dist}$ is a distance threshold for classification into the same cluster. Moreover, i indicates an index assigned to each small cluster generated by dividing the three-dimensional point cloud data.

An optimization method using a two-dimensional rectangle can be used for division into small clusters. For example, a reference that is a combination of a reference for reducing the distance between the cluster and a point, and a reference for increasing an expected value of inclusion of elements of the cluster projected on an image plane, in an identical two-dimensional label rectangle, can be used as a reference for optimizing belongingness to each of the clusters. Accordingly, a condition of constraint of a spatial distribution for an object on a two-dimensional plane provided by a two-dimensional label rectangle can be provided for clustering of the three-dimensional point cloud. Consequently, even in a case where separate objects reside closer with reference to a predefined distance threshold, there is a possibility that separation to small clusters can be achieved correctly (on an object-by-object basis).

For example, clustering that integrates points within the distance threshold into the same cluster is performed as described above, and then the following method is performed. That is, a penalty term is assumed which involves, for the point $p \in C_i$ included in each cluster $C_i$, the number of points p' that are mapped therefrom onto the image plane and are not included in the same two-dimensional label rectangle $B_j$. A method of redividing the cluster $C_i$ so as to reduce the penalty term can be assumed. Here, for example, the penalty term can be defined as follows.

[Expression 4]

$$E_{bb}(C_i)=\prod_{Bj}\left[\frac{Num(p' \in B_j)}{Num(C_i)}\right] \quad (4)$$

where all the regions where no two-dimensional label rectangle is defined belong to the same background region $B_0$. Num is a function of counting the number of elements. Equation 4 represents a concept equivalent to the entropy for the inclusion relation of the two-dimensional label rectangle for all the elements in the cluster $C_i$. Accordingly, the value of Equation 4 increases with increase in the number of cases where the elements of the cluster $C_i$ are included in different two-dimensional label rectangles on the image plane. Consequently, revision may be performed so as to minimize the value or makes the value equal to or less than the threshold.

The cluster mapping projection unit 1032 projects each small cluster of three-dimensional point clouds onto the plane coordinate system where the two-dimensional labels are defined. Here, in order to achieve the projection described above, mapping from the three-dimensional point cloud coordinates onto the plane is required to be defined. It is herein assumed that the plane coordinates where the two-dimensional labels are defined are in a coordinate system of the original image to which the two-dimensional label is assigned, and mapping from the three-dimensional point cloud coordinates onto the image plane are given. Specifically, it is assumed that calibration (position association) between the camera that is the image output device 20 and the 3D LiDAR that is the point cloud output device 30 has already been executed.

Figure 8:
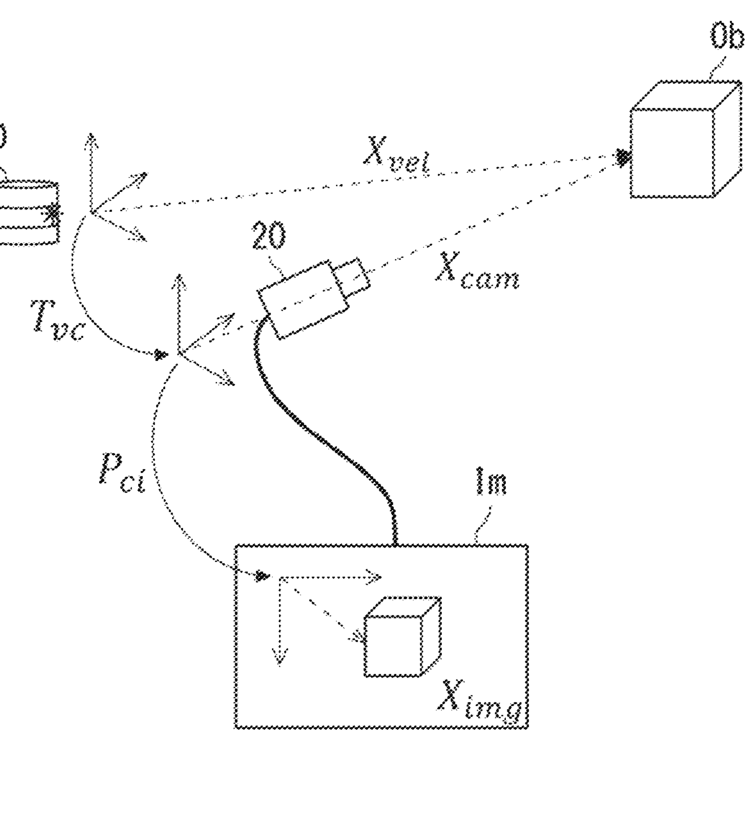
FIG. 8 is a diagram for illustrating a projection method of a three-dimensional point onto a two-dimensional plane according to the first example embodiment.

FIG. 8 is a diagram for illustrating a projection method of a three-dimensional point onto a two-dimensional plane according to the first example embodiment. Referring to FIG. 8, coordinate transformation of the calibrated optical system is described. The optical system that includes the 3D LiDAR (point cloud output device 30) and the camera (image output device 20) is assumed, and as shown in FIG. 8, a point $X_{vel}$ in the three-dimensional space measured by the 3D LiDAR can be uniquely transformed according to the point $X_{cam}$ in the camera-centered coordinate system, and a three-dimensional coordinate transformation matrix $T_{vc} \in R^{(4\times4)}$ as in the following Equation 5.

[Expression 5]

$$X_{cam} = T_{vc} X_{vel} \quad (5)$$

In a case where the camera model is nonlinear, mapping from the three-dimensional point $X_{vel}$ to the point $X_{img}$ on the image plane in the camera image Im is represented as the following Equation 6 using a function $$P_{ci}: R^4 \to R^3.$$

[Expression 6]

$$X_{img} = P_{ci}(X_{cam}) = P_{ci}(T_{vc} \cdot X_{vel}) \quad (6)$$

In a case where the camera model is linear, mapping from the three-dimensional point $X_{vel}$ to the point $X_{img}$ on the image plane in the camera image Im is represented as the following Equation 7 using a matrix $P_{ci} \in R^{(3\times4)}$.

[Expression 7]

$$X_{img} = P_{ci} X_{cam} = P_{ci} \cdot T_{vc} \cdot X_{vel} \quad (7)$$

where all the vectors indicated by Equations 5 to 7 are homogeneous vectors. That is, $X_{vel}$, $X_{cam} \in R^4$, $X_{img} \in R^3$. As described above, it should be noted that mapping of the three-dimensional point onto the image plane is not one-to-one correspondence, and only mapping from the three-dimensional point onto the image plane is uniquely determined.

In general, the elements of the matrix $T_{vc}$ are called extrinsic parameters, the coefficients or the matrix elements of the function $P_{ci}$ are called (camera) intrinsic parameters, and acquisition of these parameters are called calibration. The present example embodiment assumes that the calibration has already been executed by a certain type of means. At this time, the coordinates of the points of the three-dimensional point cloud are uniquely projected onto the respective points on the image plane by a geometrical operation. Likewise, a small cluster that is a set of points of the three-dimensional point cloud is projected onto the image plane, as a set of mapped points of elements.

Figure 9:
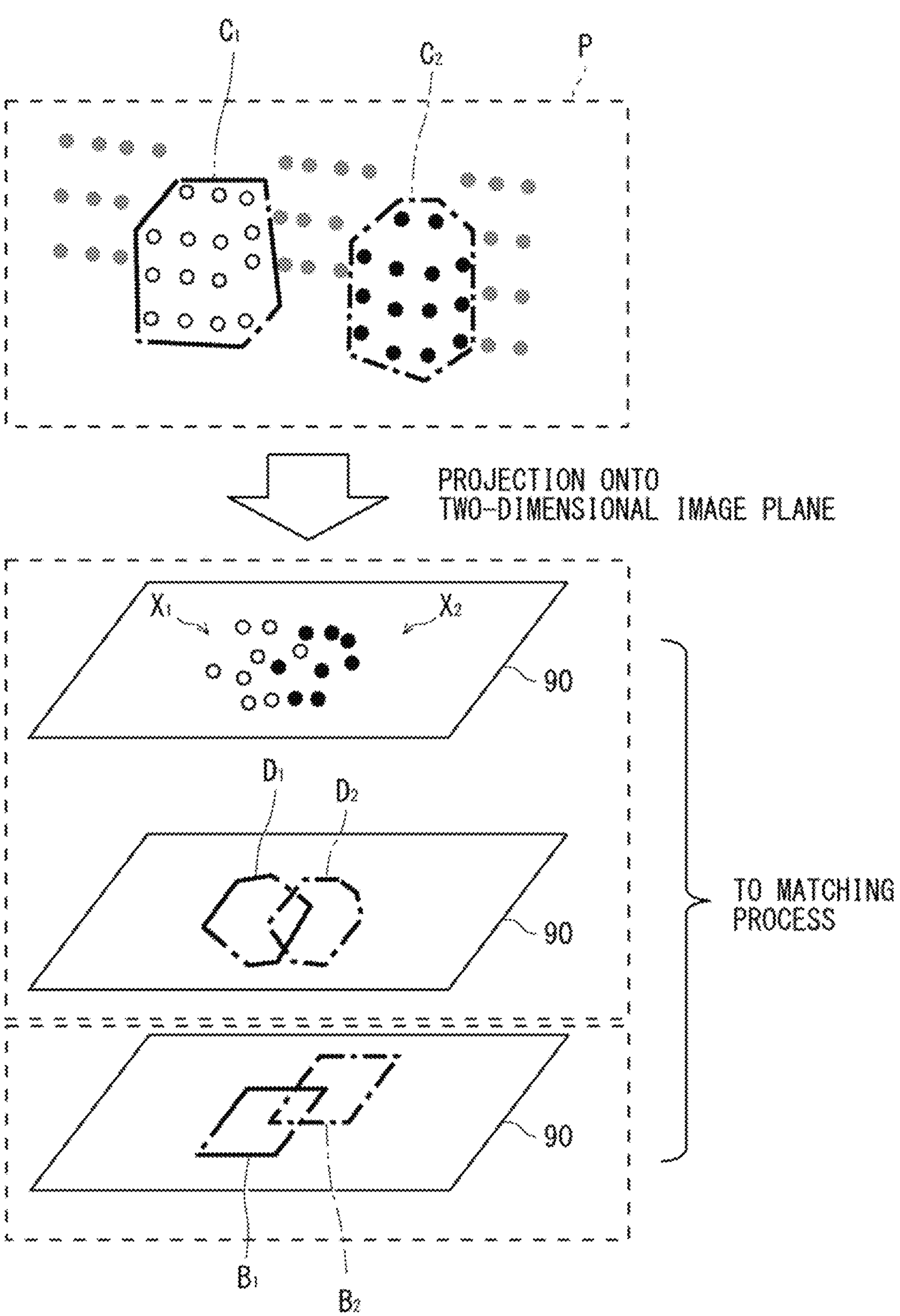
FIG. 9 is a diagram for illustrating an operation of a cluster mapping projection unit in the label conversion unit according to the first example embodiment.

FIG. 9 is a diagram for illustrating the operation of the cluster mapping projection unit 1032 in the label conversion unit 103 according to the first example embodiment. FIG. 9 schematically shows results where a convex hull that includes mapping of each small cluster of three-dimensional point clouds projected onto the two-dimensional plane and their elements is projected on the same plane as the two-dimensional label rectangle. These results are used by the label matching unit 1033, which is described later.

Here, FIG. 9 corresponds to the small cluster obtained by division through clustering shown as the example in FIG. 7. Points $X_1$ and $X_2$ respectively correspond to mapping of the small clusters $C_1$ and $C_2$ onto an image plane 90. Convex hulls $D_1$ and $D_2$ are convex hulls that respectively include the points $X_1$ and $X_2$. Rectangles $B_1$ and $B_2$ are two-dimensional label rectangles corresponding to the respective small clusters $C_1$ and $C_2$.

The label matching unit 1033 has a function of matching the small clusters projected onto the image plane 90 by the cluster mapping projection unit 1032 with the two-dimensional labels assigned by the two-dimensional label input unit 102, and selecting the small clusters matching appropriately with the respective two-dimensional labels. Specifically, the label matching unit 1033 searches for the two-dimensional label rectangles (bounding-box) $B_j$ corresponding to the points $p \in C_i$ in units of small clusters $C_i$ as shown in the following Equation 8, and associates class labels (and ID labels).

[Expression 8]

$$\text{Label}(p \in C_i) = \text{Label}(B_j), \text{ if } C_i \to B_j \quad (8)$$

Figure 10:
FIG. 10 is a diagram for illustrating a determination scheme used in a matching process performed by a label matching unit according to the first example embodiment.
Figure 10:
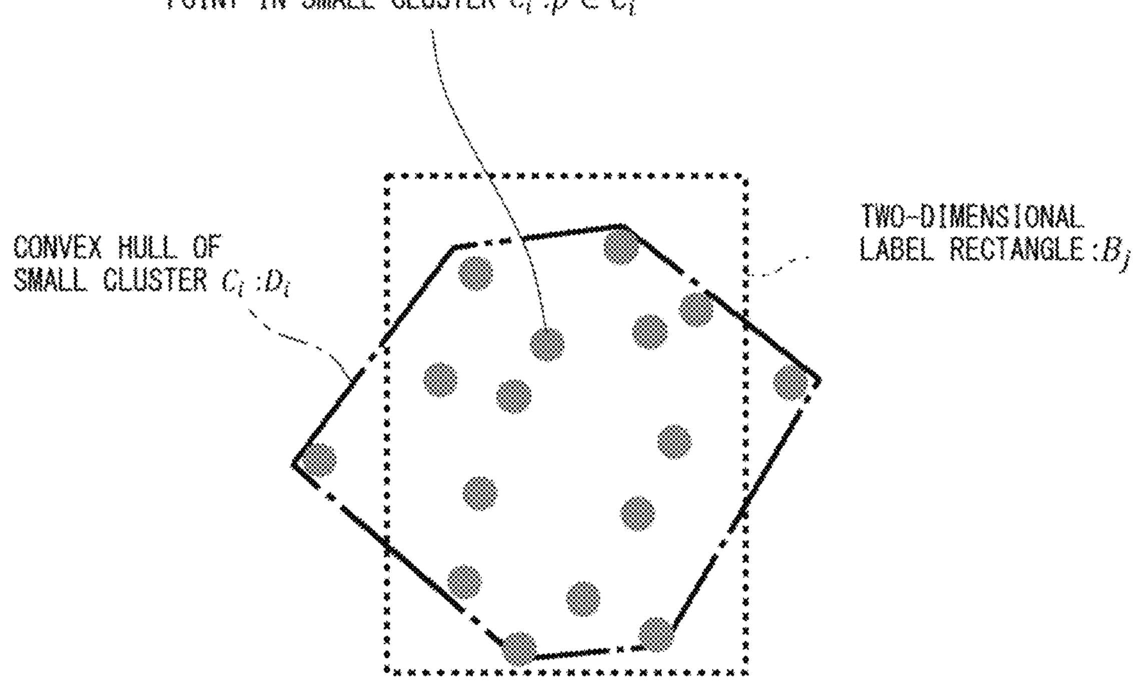
Figure 11:
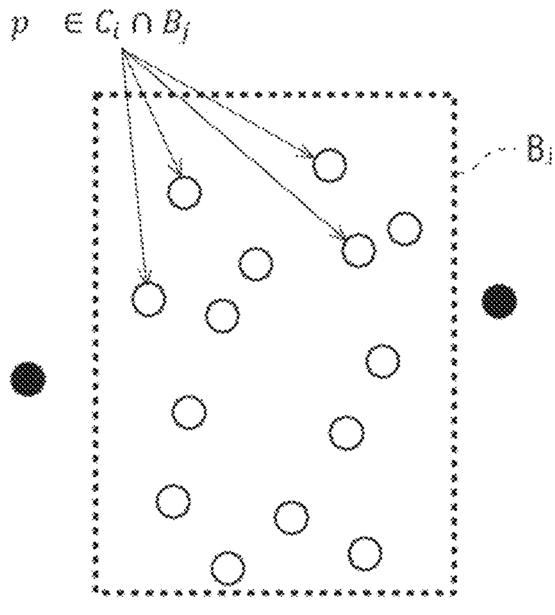
FIG. 11 is a diagram for illustrating the determination scheme used in the matching process performed by the label matching unit according to the first example embodiment.
Figure 12:
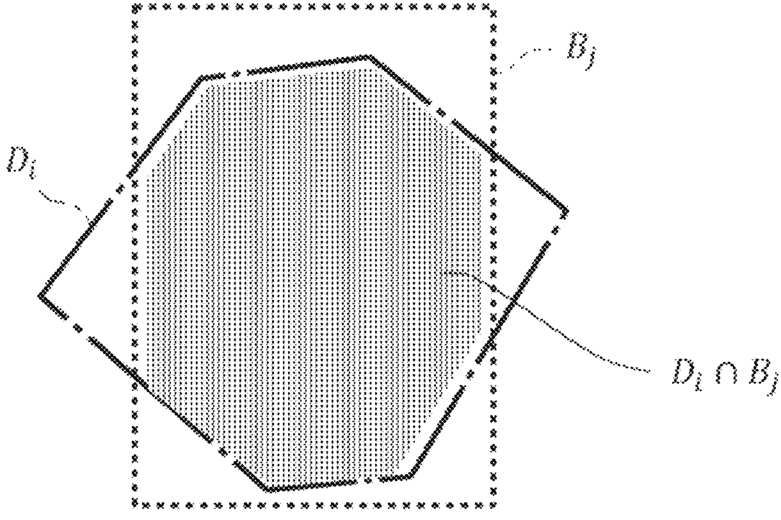
FIG. 12 is a diagram for illustrating the determination scheme used in the matching process performed by the label matching unit according to the first example embodiment.

FIGS. 10 to 12 are diagrams for illustrating the determination scheme used in the matching process performed by the label matching unit 1033 according to the first example embodiment. FIG. 10 shows a state where the convex hull $D_i$ of the small cluster $C_i$ and the two-dimensional label rectangle $B_j$ overlap each other. The label matching unit 1033 matches the small cluster $C_i$ with the two-dimensional label rectangle $B_j$ according to the ratio of the point $p \in C_i$ (the mapped point cloud on the image plane) in the small cluster $C_i$, included in the two-dimensional label rectangle $B_j$. In other words, the label matching unit 1033 matches the small cluster $C_i$ with the two-dimensional label rectangle $B_j$ according to the correlation between the mapped small cluster $C_i$ and the two-dimensional label rectangle $B_j$.

FIG. 11 is a diagram for illustrating a first method of calculating the ratio where the mapped point cloud constituting the small cluster are included in the two-dimensional label rectangle $B_j$. FIG. 11 relates to a method of calculating the in-box ratio of the point cloud included in the two-dimensional label rectangle $B_j$. That is, the label matching unit 1033 calculates the in-box ratio of the point cloud, and assigns each small cluster the same label as the two-dimensional label rectangle having the highest in-box ratio. The in-box ratio corresponds to the parameter representing the correlation between the mapped small cluster $C_i$ and the two-dimensional label rectangle $B_j$. In other words, the parameter corresponds to the in-box ratio that is the ratio where the elements of the mapped small cluster are included in the two-dimensional label data. At this time, if the maximum in-box ratio about a certain small cluster does not exceeds a predetermined threshold, the label matching unit 1033 may determine that there is no corresponding label (Label=UnKnown).

Specifically, the label matching unit 1033 calculates the in-box ratio IBR according to the following Equation 9.

[Expression 9]

$$IBR(i, j) = \frac{Num(p_k \in C_i \cap B_j)}{Num(p_k \in C_i)} \quad (9)$$

where $C_i$ indicates a small cluster, $B_j$ indicates a two-dimensional label rectangle, and $p_k$ indicates the point of an element of the small cluster. Furthermore, i, j and k are indices of a corresponding set member. Num( ) is a function of counting the number of elements.

FIG. 12 is a diagram for illustrating a second method of calculating the ratio where the mapped point cloud constituting the small cluster is included in the two-dimensional label rectangle $B_j$. FIG. 12 relates to a method of calculating the intersection over union between the convex hull of the mapped point cloud of the small cluster and the two-dimensional label rectangle $B_j$. That is, the label matching unit 1033 calculates the intersection over union (IoU), and assigns each small cluster the same label as the two-dimensional label rectangle having the highest intersection over union. The intersection over union corresponds to the parameter representing the correlation between the mapped small cluster $C_i$ and the two-dimensional label rectangle $B_j$. In other words, the parameter corresponds to the intersection over union between the convex hull formed by the mapped small cluster and the two-dimensional label data. At this time, if the maximum IoU about a certain small cluster does not exceed a predetermined threshold, the label matching unit 1033 may determine that there is no corresponding label (Label=UnKnown).

Specifically, the label matching unit 1033 calculates the intersection over union (IoU) by the following Equation 10.

[Expression 10]

$$IoU(i, j) = \frac{\text{Area}(D_i \cap B_j)}{\text{Area}(D_i \cup B_j)} \tag{10}$$

where $D_i$ is the convex hull of the small cluster $C_i$ on the image plane. Area( ) is a function of obtaining area.

The label matching unit 1033 may combine the point in-box ratio indicated by the above Equation 9 with the intersection over union indicated by the above Equation 10, and determine the two-dimensional label rectangle corresponding to the small cluster. For example, as indicated by the following Equation 11, with respect to the small cluster and the point cloud constituting the small cluster, the label matching unit 1033 may regard the two-dimensional label rectangle $B_j$ that has IBR exceeding the threshold $th_{ibr}$ and has the maximum IoU, as the label of the small cluster and the point cloud constituting the small cluster. Here, Label (*) represents label data, assigned to data *, where position information is excluded. In a specific example, the label data is [class label and ID label].

[Expression 11]

$$\text{Label}(p \in C_i) = \text{Label}\left(\text{Argmax}_{B_j}\{IoU(i, j) \mid IBR(i, j) > th_{ibr}\}\right) \tag{11}$$

Advantageous Effects

According to the image processing system 100 according to the first example embodiment, from the two-dimensional label assigned to the image data, the three-dimensional label for the corresponding three-dimensional point cloud data can be automatically generated. Accordingly, an imaging system (e.g., an imaging system including a camera and 3D LiDAR) capable of simultaneously obtaining a two-dimensional image and a three-dimensional point cloud can generate label data common between the two-dimensional image and the three-dimensional point cloud, only with a cost of assigning the label to the image. Consequently, the label data can be easily used for a machine learning task using two data items that are the two-dimensional image and the three-dimensional point cloud.

The thus generated three-dimensional point cloud label can be used as follows. For example, the three-dimensional point cloud label can be used as an evaluation dataset for performance evaluation for a three-dimensional object detection task for estimating the point cloud corresponding to the object only from the three-dimensional point cloud and outputting the three-dimensional region position of the specific object. For example, the three-dimensional point cloud label can be used as a dataset for learning in a case of achieving a three-dimensional object detection task through statistical machine learning.

(Operation)

Figure 13:
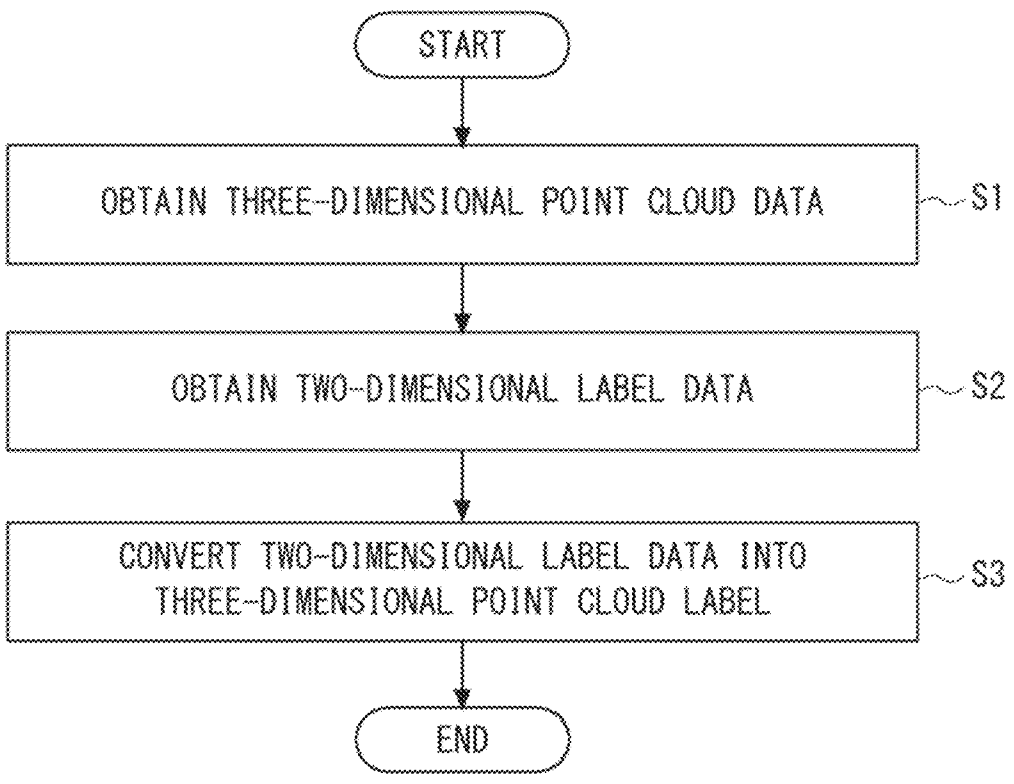
FIG. 13 is a flowchart showing an image processing method executed by the electronic control device according to the first example embodiment.

FIG. 13 is a flowchart showing an image processing method executed by the electronic control device 10 according to the first example embodiment. First, the three-dimensional point cloud input unit 101 of the electronic control device 10 obtains three-dimensional point cloud data from the point cloud output device 30 (step S1). The two-dimensional label input unit 102 of the electronic control device 10 obtains two-dimensional label data (step S2). Specifically, the two-dimensional label input unit 102 obtains an image from the image output device 20, and obtains preliminarily stored two-dimensional label data corresponding to this image. Alternatively, the two-dimensional label input unit 102 obtains an image from the image output device 20, and obtains two-dimensional label data that has been automatically generated by the electronic control device 10 through machine learning or the like and corresponds to this image. Next, the label conversion unit 103 executes a label conversion process of converting the two-dimensional label data into a three-dimensional point cloud label (step S3). The details of the process of S3 are described later. Note that the processes of S1 to S3 can be consecutively and repeatedly executed for a plurality of image series.

Figure 14:
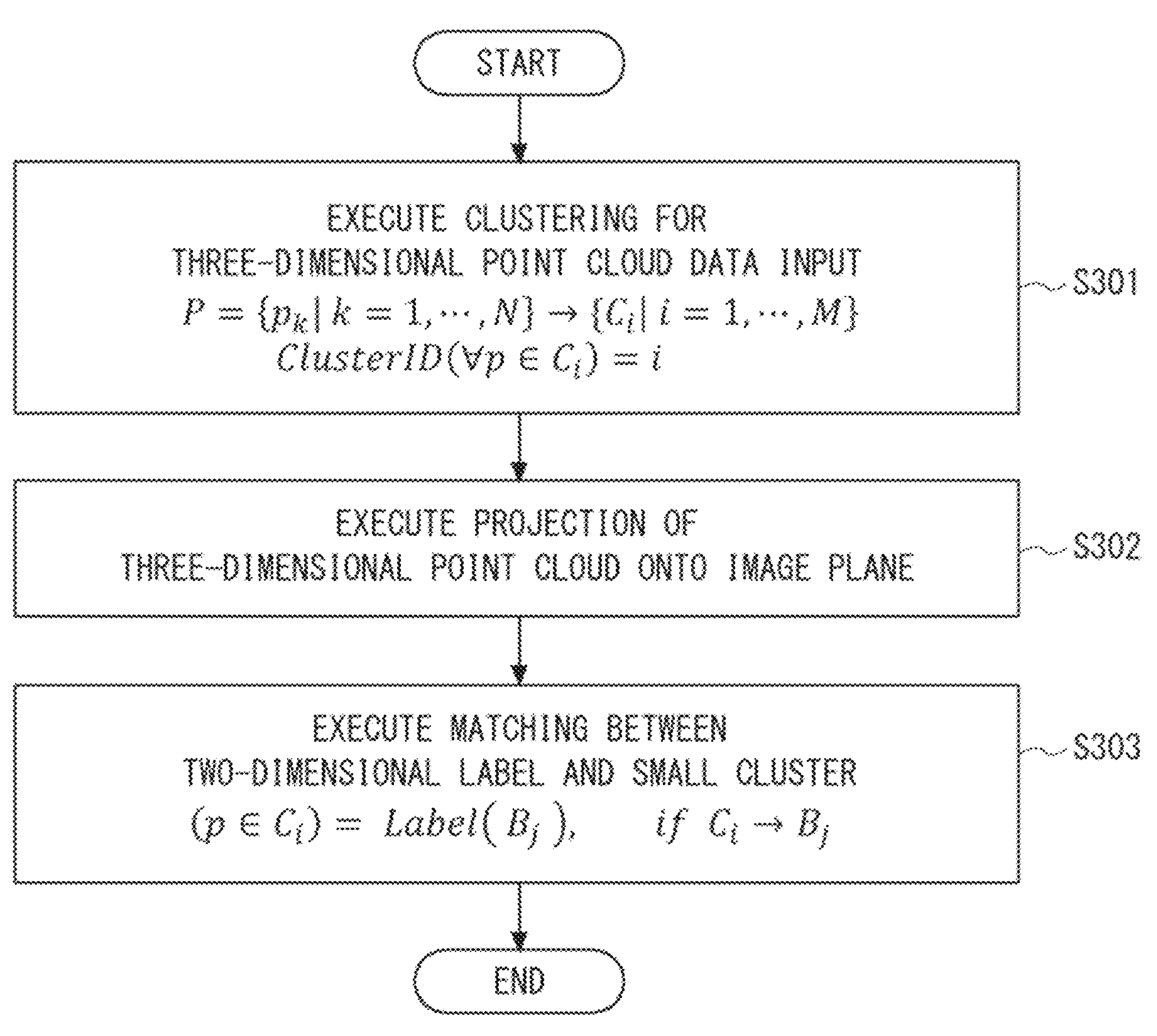
FIG. 14 is a flowchart showing an operation of the label conversion unit according to the first example embodiment.

FIG. 14 is a flowchart showing the operation of the label conversion unit 103 according to the first example embodiment. The three-dimensional point cloud dividing unit 1031 of the label conversion unit 103 applies the aforementioned clustering to the obtained three-dimensional point cloud data, and divides the entire three-dimensional point cloud data into small clusters (step S301). Next, the cluster mapping projection unit 1032 of the label conversion unit 103 projects the three-dimensional point cloud onto the same two-dimensional coordinate system (image plane) as that for the two-dimensional label data (step S302). Lastly, the label matching unit 1033 of the label conversion unit 103 executes matching between the two-dimensional label rectangle and the small cluster on the image plane (step S303). Accordingly, the label matching unit 1033 executes a process of assigning the three-dimensional point belonging to the small cluster corresponding to the selected two-dimensional label rectangle the same class label (or the ID label) as that of the selected two-dimensional label rectangle.

Second Example Embodiment

Next, a second example embodiment is described with reference to the drawings. In order to clarify the illustration, items of the following description and drawings are appropriately omitted and simplified. In each drawing, the same elements are assigned the same symbols, and redundant description is omitted as required. Note that the system configuration according to the second example embodiment is substantially similar to that shown in FIG. 2. Accordingly, the description thereof is omitted. The second example embodiment is different from the first example embodiment in that the second example embodiment generates an image segmentation label.

The image processing system 100 according to the second example embodiment generates an image segmentation label using the three-dimensional point cloud label generated by the image processing method according to the first example embodiment. Here, the image segmentation label is the class label (or the ID label) assigned along the shape of the object in the image in units of pixels of the region corresponding to the object.

Here, the first example embodiment described above relates to the two-dimensional label data (rectangle) used for the problem of object detection that estimates an object in an image on a two-dimensional rectangle level. Meanwhile, the image segmentation label is label data used for a problem of image (semantic) segmentation that performs distinct painting (classification) of the object on a pixel level. The image segmentation label requires distinct painting (classification) on a pixel level. Accordingly, the cost is high for manual label assigning. On the other hand, in the second example embodiment, the three-dimensional point cloud label can be automatically generated from the two-dimensional label (rectangle), and the image segmentation label can be automatically generated from the three-dimensional point cloud label.

Figure 15:
FIG. 15 is a functional block diagram schematically showing a configuration of an electronic control device according to a second example embodiment.
Figure 15:
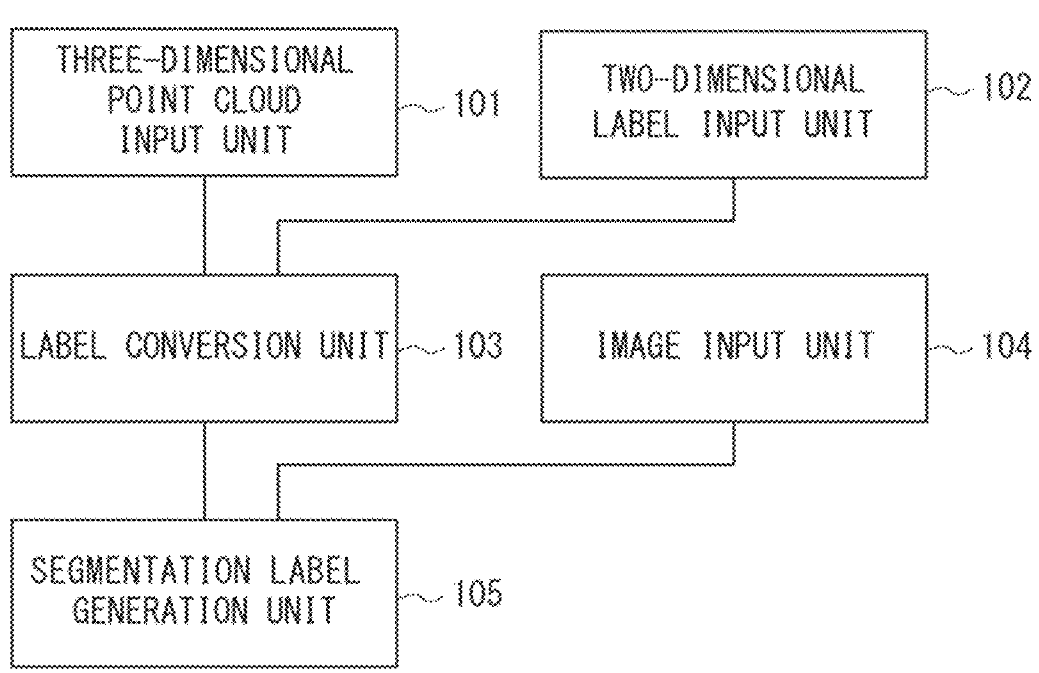

FIG. 15 is a functional block diagram schematically showing the configuration of the electronic control device 10 according to the second example embodiment. As with the first example embodiment, the electronic control device 10 according to the second example embodiment includes a three-dimensional point cloud input unit 101, a two-dimensional label input unit 102, and a label conversion unit 103. Furthermore, the electronic control device 10 according to the second example embodiment includes an image input unit 104, and a segmentation label generation unit 105. The operations of the three-dimensional point cloud input unit 101, the two-dimensional label input unit 102, and the label conversion unit 103 are substantially similar to those in the first example embodiment. Accordingly, the description thereof is omitted.

The image input unit 104 functions as image input means. The image input unit 104 obtains (receives) three-dimensional point cloud data, a corresponding two-dimensional label, and a corresponding camera image. That is, the image input unit 104 obtains labelled three-dimensional point cloud data. The segmentation label generation unit 105 functions as segmentation label generation means. The segmentation label generation unit 105 generates image segmentation label data using the labelled three-dimensional point cloud data output from the label conversion unit 103. There are a case where an image obtained by the image input unit 104 is used, and a case where this image is not used. According to the second example embodiment, the three-dimensional points output from the label conversion unit 103 are projected on the image plane, and are interpolated with image pixels between the projected points with respect to each label (class label or ID label), thereby generating the segmentation label.

Here, an existing image interpolation process can be used for the pixel interpolation process. For example, a range, such as of 3×3 pixels, is designated, closing of a morphology operation is performed, and a process of filling up adjacent pixels is performed. That is, pixels around the labelled three-dimensional point are assigned the label. By performing such a process, image segmentation label data where pixels overlapping the object in the image are filled can be generated from the three-dimensional point cloud label.

The interpolation process may be optimized with reference to input image information (camera image). After the interpolation process is executed for each label, a method of determining a boundary with reference to the edges of image, color information and the like upon occurrence of interference of interpolation pixels between different labels may be used.

Advantageous Effects

The image segmentation label generated by the method according to the second example embodiment may be used as described below. For example, the image segmentation label can be used as an evaluation dataset for performance evaluation for the image segmentation task that estimates region pixels of an object only from an input image, and outputs a result where a mask region is filled. For example, the image segmentation label can be used as a dataset for learning in a case of achieving an image segmentation task through statistical machine learning.

(Operation)

Figure 16:
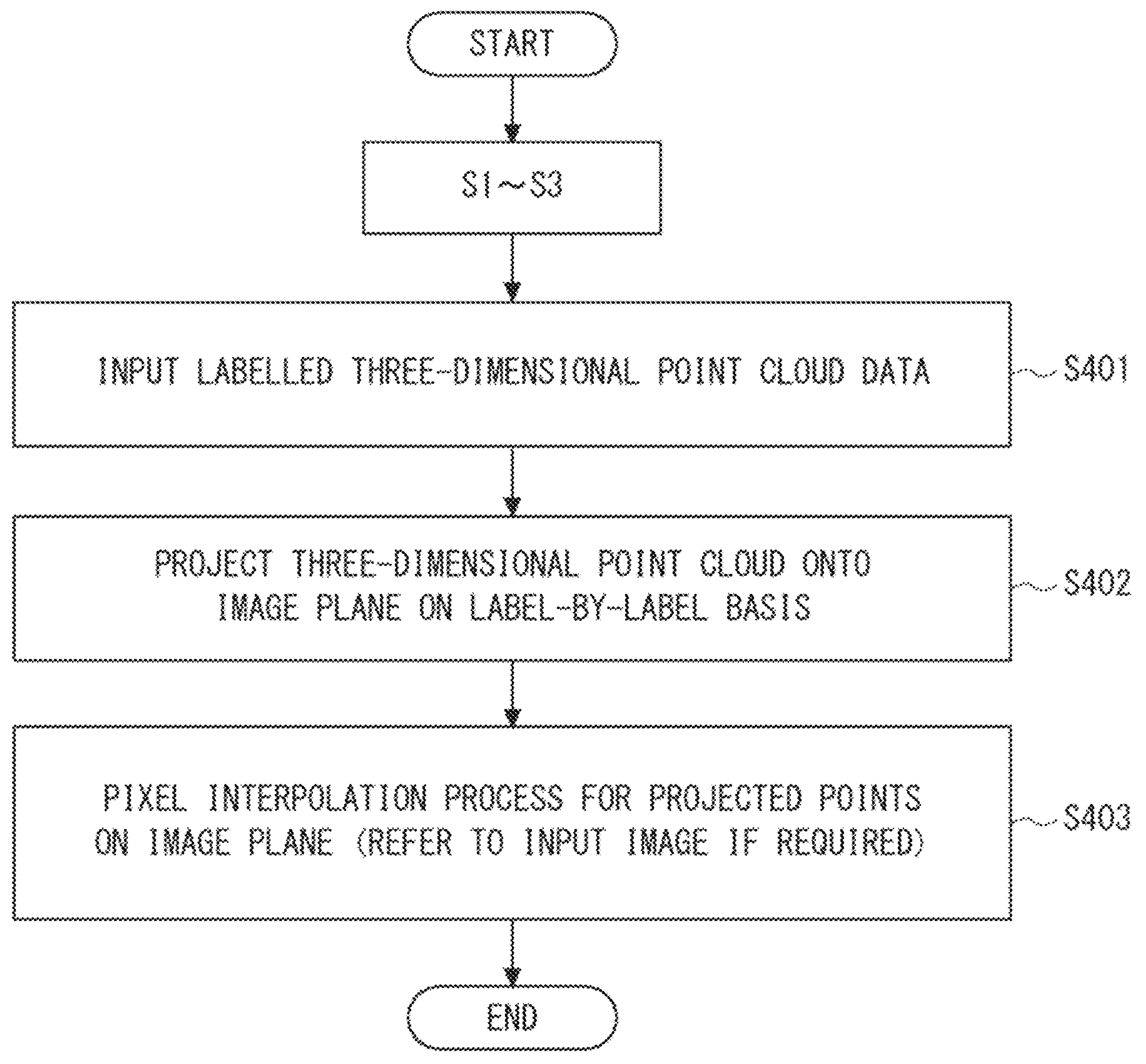
FIG. 16 is a flowchart showing an image processing method executed by the electronic control device according to the second example embodiment.

FIG. 16 is a flowchart showing an image processing method executed by the electronic control device 10 according to the second example embodiment. First, the process of S1 to S3 (FIGS. 13 and 14) described above are executed. Next, the image input unit 104 obtains labelled three-dimensional point cloud data (step S401). The segmentation label generation unit 105 projects the obtained three-dimensional point cloud data on the two-dimensional image plane on a label-by-label basis (step S402). The segmentation label generation unit 105 performs a pixel interpolation process for the projected points on a label-by-label basis on the two-dimensional image plane (step S403). At this time, information on the input image can be referred to as required.

Modified Example

Note that the present invention is not limited to the aforementioned example embodiments, and can be appropriately modified in a range without departing from the spirit. For example, one or more processes of steps in the flowcharts described above can be omitted.

In the examples described above, the program can be stored using any of various types of non-transitory computer readable media, and provided for the computer. The non-transitory computer-readable media encompasses various types of tangible storage medium. Examples of the non-transitory computer-readable media include magnetic recording media (e.g., a flexible disk, a magnetic tape, and a hard disk drive), magnetooptical recording media (e.g., an magnetooptical disk), a CD-ROM, a CD-R, a CD-R/W, semiconductor memories (e.g., a mask ROM, a PROM (Programmable ROM), an EPROM (Erasable PROM), a flash ROM, and a RAM). The program can be supplied to the computer through any of various types of transitory computer readable media. Examples of transitory computer-readable media include an electric signal, an optical signal, and electromagnetic waves. The transitory computer-readable media can be supplied to the computer through any of wired communication paths, such as electric wire or an optical fiber, or a wireless communication path.

The invention of the present application has been described above with reference to the example embodiments. However, the invention of the present application is not limited by the above description. The configuration and details of the invention of the present application can be variously modified within the scope of the invention in a manner allowing those skilled in the art to understand.

A part or all of the aforementioned example embodiments can be described also as the following Supplementary notes, but are not limited to the followings.

Supplementary Note 1

An image processing device, comprising:

three-dimensional point cloud obtaining means for obtaining three-dimensional point cloud data that represents a three-dimensional point cloud of an object;

two-dimensional label obtaining means for obtaining two-dimensional label data that is label data corresponding to a two-dimensional image of the object; and label conversion means for associating the two-dimensional label data with the three-dimensional point cloud data, and converting the two-dimensional label data into three-dimensional point cloud label data that indicates a label of the three-dimensional point cloud.

Supplementary Note 2

The image processing device according to Supplementary Note 1, wherein the label conversion means associates the two-dimensional label data with the three-dimensional point cloud data, by associating a mapped point cloud obtained by projecting the three-dimensional point cloud onto an image plane corresponding to the two-dimensional image, with the two-dimensional label data.

Supplementary Note 3

The image processing device according to Supplementary Note 2, wherein the label conversion means associates the two-dimensional label data with the three-dimensional point cloud data, by matching the two-dimensional label data with the mapped three-dimensional point cloud.

Supplementary Note 4

The image processing device according to any one of Supplementary Notes 1 to 3, wherein the label conversion means divides the three-dimensional point cloud into a plurality of small clusters by applying clustering to the three-dimensional point cloud in conformity with a predetermined reference, and associates the two-dimensional label data with each of the divided small clusters.

Supplementary Note 5

The image processing device according to Supplementary Note 4, wherein the label conversion means associates the two-dimensional label data with the three-dimensional point cloud data, according to a parameter that represents a correlation between the mapped small clusters obtained by projecting the small clusters onto an image plane corresponding to the two-dimensional image, and the two-dimensional label data.

Supplementary Note 6

The image processing device according to Supplementary Note 5, wherein the parameter corresponds to at least one of an in-box ratio that is a ratio of elements, of each of the mapped small clusters, included in the two-dimensional label data, and an intersection over union between a convex hull formed of each of the mapped small clusters, and the two-dimensional label data.

Supplementary Note 7

The image processing device according to any one of Supplementary Notes 4 to 6, wherein for the clustering, the label conversion means uses, as a reference for optimizing belongingness to each of the clusters of the three-dimensional point cloud, a reference that is a combination of a reference of reducing a distance between the cluster and a point, and a reference of increasing an expected value of inclusion of elements of the cluster projected on an image plane, in an identical two-dimensional label rectangle.

Supplementary Note 8

The image processing device according to any one of Supplementary Notes 1 to 7, further comprising segmentation label generation means for generating image segmentation label data, by applying a pixel interpolation process to mapped data obtained by projecting the three-dimensional point cloud label data onto an image plane corresponding to the two-dimensional image.

Supplementary Note 9

An image processing method, comprising:

obtaining three-dimensional point cloud data that represents a three-dimensional point cloud of an object;

obtaining two-dimensional label data that is label data corresponding to a two-dimensional image of the object; and associating the two-dimensional label data with the three-dimensional point cloud data, and converting the two-dimensional label data into three-dimensional point cloud label data that indicates a label of the three-dimensional point cloud.

Supplementary Note 10

The image processing method according to Supplementary Note 9, wherein the two-dimensional label data is associated with the three-dimensional point cloud data, by associating a mapped point cloud obtained by projecting the three-dimensional point cloud onto an image plane corresponding to the two-dimensional image, with the two-dimensional label data.

Supplementary Note 11

The image processing method according to Supplementary Note 10, wherein the two-dimensional label data is associated with the three-dimensional point cloud data, by matching the two-dimensional label data with the mapped three-dimensional point cloud.

Supplementary Note 12

The image processing method according to any one of Supplementary Notes 9 to 11, wherein the three-dimensional point cloud is divided into a plurality of small clusters by applying clustering to the three-dimensional point cloud in conformity with a predetermined reference, and the two-dimensional label data is associated with each of the divided small clusters.

Supplementary Note 13

The image processing method according to Supplementary Note 12, wherein the two-dimensional label data is associated with the three-dimensional point cloud data, according to a parameter that represents a correlation between the mapped small clusters obtained by projecting the small clusters onto an image plane corresponding to the two-dimensional image, and the two-dimensional label data.

Supplementary Note 14

The image processing method according to Supplementary Note 13, wherein the parameter corresponds to at least one of an in-box ratio that is a ratio of elements, of each of the mapped small clusters, included in the two-dimensional label data, and an intersection over union between a convex hull formed of each of the mapped small clusters, and the two-dimensional label data.

Supplementary Note 15

The image processing method according to any one of Supplementary Notes 12 to 14, wherein for the clustering, the method uses, as a reference for optimizing belongingness to each of the clusters of the three-dimensional point clouds, a reference that is a combination of a reference of reducing a distance between the cluster and a point, and a reference of increasing an expected value of inclusion of elements of the cluster projected on an image plane, in an identical two-dimensional label rectangle.

Supplementary Note 16

The image processing method according to any one of Supplementary Notes 9 to 15, the method generates image segmentation label data, by applying a pixel interpolation process to mapped data obtained by projecting the three-dimensional point cloud label data onto an image plane corresponding to the two-dimensional image.

Supplementary Note 17

A non-transitory computer-readable medium storing a program causing a computer to execute:

a step of obtaining three-dimensional point cloud data that represents a three-dimensional point cloud of an object;

a step of obtaining two-dimensional label data that is label data corresponding to a two-dimensional image of the object; and a step of associating the two-dimensional label data with the three-dimensional point cloud data, and converting the two-dimensional label data into three-dimensional point cloud label data that indicates a label of the three-dimensional point cloud.

REFERENCE SIGNS LIST

1 Image processing device
2 Three-dimensional point cloud obtaining unit
4 Two-dimensional label obtaining unit
6 Label conversion unit
10 Electronic control device
20 Image output device
30 Point cloud output device
40 Terminal device
90 Image plane
100 image processing system
101 Three-dimensional point cloud input unit
102 Two-dimensional label input unit
103 Label conversion unit
104 Image input unit
105 Segmentation label generation unit
1031 Three-dimensional point cloud dividing unit
1032 Cluster mapping projection unit
1033 Label matching unit

What is claimed is:

1. An image processing system comprising:

at least one memory storing instructions; and at least one processor configured to execute the instructions to:

obtain a two-dimensional image including an object;

obtain three-dimensional point clouds including the object;

obtain a three-dimensional container which identifies a cluster among the three-dimensional point clouds to associate label data with the cluster;

associate the label data with the cluster, the cluster including a plurality of three-dimensional points, the plurality of three-dimensional points being a part of the three-dimensional point clouds, and the label data being associated with the object included in the two-dimensional image; and associate the label data with two-dimensional point clouds that are obtained by projecting the cluster onto a plane, wherein the two-dimensional point clouds are identified by a two-dimensional container which is associated with the three-dimensional container.

2. The image processing system according to claim 1, wherein the label data indicates a class of the object.

3. The image processing system according to claim 1, wherein obtaining a three-dimensional container which identifies the cluster among the three-dimensional point clouds to associate label data with the cluster includes identifying a plurality of clusters among the three-dimensional point clouds, each of the plurality of clusters including ones of other pluralities of three-dimensional points, wherein the label data is obtained from a plurality of label data corresponding to a plurality of objects included in the two-dimensional image, and wherein associating the label data with the cluster includes associating the plurality of label data with the plurality of clusters.

4. The image processing system according to claim 1, wherein the at least one processor is further configured to execute the instructions to:

obtain a two-dimensional container by projecting the three-dimensional container onto an image, wherein the two-dimensional container covers the two-dimensional point clouds.

5. The image processing system according to claim 1, wherein obtaining a three-dimensional container which identifies the cluster among the three-dimensional point clouds to associate label data with the cluster includes determining a three-dimensional container on the three-dimensional point clouds.

6. The image processing system according to claim 1, wherein the at least one processor is further configured to execute the instructions to:

obtain the label data corresponding to the object included in the two-dimensional image of the object.

7. The image processing system according to claim 1, wherein the three-dimensional point clouds indicate a structure of an environment.

8. The image processing system according to claim 1, wherein the three-dimensional point clouds indicate a structure of an actual environment.

9. The image processing system according to claim 1, wherein the cluster includes the object.

10. The image processing system according to claim 1, wherein the three-dimensional point clouds are obtained by a sensor.

11. The image processing system according to claim 10, wherein the sensor uses a 3D LiDAR.

12. The image processing system according to claim 1, wherein the two-dimensional image is a part of a captured image captured by a camera.

13. The image processing system according to claim 1, wherein identifying the cluster comprises distinguishing between the cluster and other three-dimensional points by applying clustering to the three-dimensional point clouds.

14. The image processing system according to claim 1, wherein associating the label data with the cluster comprises associating the label data with the cluster in response to identifying the cluster.

15. An image processing method comprising:

obtaining a two-dimensional image including an object;

obtaining three-dimensional point clouds including the object;

obtaining a three-dimensional container which identifies a cluster among the three-dimensional point clouds to associate label data with the cluster;

associating the label data with the cluster, the cluster including a plurality of three-dimensional points, the plurality of three-dimensional points being a part of the three-dimensional point clouds, and the label data being associated with the object included in the two-dimensional image; and associating the label data with two-dimensional point clouds that are obtained by projecting the cluster onto a plane, wherein the two-dimensional point clouds are identified by a two-dimensional container which is associated with the three-dimensional container.

16. The image processing method according to claim 15, wherein the label data indicates a class of the object.

17. The image processing method according to claim 15, wherein obtaining a three-dimensional container which identifies the cluster among the three-dimensional point clouds to associate label data with the cluster includes identifying a plurality of clusters among the three-dimensional point clouds, each of the plurality of clusters including ones of other pluralities three-dimensional points, wherein the label data is obtained from a plurality of label data corresponding to a plurality of objects included in the two-dimensional image, and wherein associating the label data with the cluster includes associating the plurality of label data with the plurality of clusters.

18. The image processing method according to claim 15, further comprising:

obtaining a three-dimensional container covering the cluster to associate the label data with the cluster.

19. The image processing method according to claim 18, further comprising:

obtaining a two-dimensional container by projecting the three-dimensional container onto an image, wherein the two-dimensional container covers the two-dimensional point clouds.

20. The image processing method according to claim 15, wherein the three-dimensional point clouds indicate a structure of an environment.

21. The image processing method according to claim 15, wherein the at least one cluster includes the object.

22. The image processing method according to claim 15, wherein the two-dimensional image is a part of a captured image captured by a camera.

23. The image processing method according to claim 15, wherein identifying the cluster comprises distinguishing between the cluster and other three-dimensional points by applying clustering to the three-dimensional point clouds.

24. The image processing method according to claim 15, wherein associating the label data with the cluster comprises associating the label data with the cluster in response to identifying the cluster.

25. A non-transitory computer readable medium storing a program for causing a computer to:

obtain a two-dimensional image including an object;

obtain three-dimensional point clouds including the object;

obtain a three-dimensional container which identifies a cluster among the three-dimensional point clouds to associate label data with the cluster;

associate the label data with the cluster, the cluster including a plurality of three-dimensional points, the plurality of three-dimensional points being a part of the three-dimensional point clouds, and the label data being associated with the object included in the two-dimensional image; and associate the label data with two-dimensional point clouds that are obtained by projecting the cluster onto a plane, wherein the two-dimensional point clouds are identified by a two-dimensional container which is associated with the three-dimensional container.

26. The non-transitory computer readable medium according to claim 25, wherein the label data indicates a class of the object.

27. The non-transitory computer readable medium according to claim 25, wherein the obtaining of a three-dimensional container which identifies the cluster among the three-dimensional point clouds to associate label data with the cluster includes identifying a plurality of clusters among the three-dimensional point clouds, each of the plurality of clusters including a plurality of three-dimensional points, wherein the obtaining the label data includes obtaining a plurality of label data corresponding to a plurality of objects included in the two-dimensional image, and wherein associating the label data with the cluster includes associating the plurality of label data with the plurality of clusters.

28. The non-transitory computer readable medium according to claim 25, wherein the program further causes the computer to:

obtain a two-dimensional container by projecting the three-dimensional container onto an image, wherein the two-dimensional container covers the two-dimensional point clouds.

29. The non-transitory computer readable medium according to claim 25, wherein the three-dimensional point clouds indicate a structure of an environment.

30. The non-transitory computer readable medium according to claim 25, wherein the cluster includes the object.

31. The non-transitory computer readable medium according to claim 25, wherein the two-dimensional image is a part of a captured image captured by a camera.

32. The non-transitory computer readable medium according to claim 25, wherein identifying the cluster comprises distinguishing between the cluster and other three-dimensional points by applying clustering to the three-dimensional point clouds.

33. The non-transitory computer readable medium according to claim 25, wherein associating the label data with the cluster comprises associating the label data with the cluster in response to identifying the cluster.

* * * * *